(12) United States Patent
Cho et al.

(10) Patent No.: US 10,885,301 B2
(45) Date of Patent: Jan. 5, 2021

(54) METHOD FOR OBTAINING BIOMETRIC INFORMATION AND ELECTRONIC DEVICE THEREOF

(71) Applicant: Samsung Electronics Co., Ltd., Gyeonggi-do (KR)

(72) Inventors: Joung-Min Cho, Seoul (KR); Oh Hyuck Kwon, Gyeonggi-do (KR); Taesung Kim, Gyeonggi-do (KR); Hyungdal Kim, Gyeonggi-do (KR); Hyunchang Shin, Gyeonggi-do (KR); Song Hee Jung, Gyeonggi-do (KR); Jeong-Min Park, Gyeonggi-do (KR); Hyungsup Byeon, Gyeonggi-do (KR); Heung-Sik Shin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 16/158,510

(22) Filed: Oct. 12, 2018

(65) Prior Publication Data

US 2019/0114458 A1 Apr. 18, 2019

(30) Foreign Application Priority Data

Oct. 13, 2017 (KR) .................. 10-2017-0133121

(51) Int. Cl.
*G06K 9/00* (2006.01)
*G06K 9/22* (2006.01)
(Continued)

(52) U.S. Cl.
CPC ......... *G06K 9/0004* (2013.01); *G06K 9/0002* (2013.01); *G06K 9/2027* (2013.01);
(Continued)

(58) Field of Classification Search
CPC .. G06K 9/0004; G06K 9/0002; G06K 9/2027; G06K 9/2036; G06K 9/22;
(Continued)

(56) References Cited

U.S. PATENT DOCUMENTS

| 9,947,265 B2 | 4/2018 | Park et al. |
| 10,088,939 B2 | 10/2018 | Benkley, III et al. |

(Continued)

FOREIGN PATENT DOCUMENTS

| CN | 101183506 A | 5/2008 |
| EP | 2 267 690 A1 | 6/2010 |

(Continued)

OTHER PUBLICATIONS

International Search Report dated Jan. 15, 2019.
European Search Report dated Jul. 22, 2020.

*Primary Examiner* — Jianxun Yang
(74) *Attorney, Agent, or Firm* — Cha & Reiter, LLC

(57) ABSTRACT

An apparatus and method for obtaining biometric information in an electronic device are provided. An electronic device comprising a display comprising a plurality of pixels, a biometric sensor disposed in at least a partial region of the display; and at least one processor, wherein the at least one processor is configured to receive an input for sensing biometric information of an external object, in response to the input, select at least one pixel among a first pixel and a second pixel in accordance with history information about use of the first pixel and second pixel, wherein the first pixel and the second pixel are disposed in the at least the partial region of the display proximate to the biometric sensor, and obtain the biometric information of an external object through the biometric sensor by using light irradiated by the selected at least one pixel.

18 Claims, 23 Drawing Sheets

(51) Int. Cl.
*G09G 3/20* (2006.01)
*G06K 9/20* (2006.01)
*G06F 3/041* (2006.01)
*G06F 3/042* (2006.01)
*G06F 3/044* (2006.01)

(52) U.S. Cl.
CPC ............. *G06K 9/2036* (2013.01); *G06K 9/22* (2013.01); *G09G 3/20* (2013.01); *G06F 3/042* (2013.01); *G06F 3/044* (2013.01); *G06F 3/0412* (2013.01)

(58) Field of Classification Search
CPC ........... G06K 9/00006; G06K 9/00013; G06K 9/6267; G06K 9/036; G09G 3/20; G06F 3/0412; G06F 3/042; G06F 3/044; G06F 21/32; G06F 2221/2147; G06F 21/316; G06F 3/04883; G06F 3/0414; H04W 12/00508; H04L 63/0861; G01L 1/142
See application file for complete search history.

(56) References Cited

U.S. PATENT DOCUMENTS

| | | |
|---|---|---|
| 2009/0274343 A1 | 11/2009 | Clarke |
| 2015/0030217 A1 | 1/2015 | Wickboldt et al. |
| 2015/0242673 A1 | 8/2015 | Singhal |
| 2016/0063230 A1* | 3/2016 | Alten ...................... G06F 21/32 |
| 2017/0220838 A1 | 8/2017 | He et al. |
| 2017/0316248 A1* | 11/2017 | He .................... G06K 9/00006 |

FOREIGN PATENT DOCUMENTS

| | | |
|---|---|---|
| KR | 10-2014-0142370 A | 12/2014 |
| KR | 10-2016-0007825 A | 1/2016 |
| KR | 10-2016-0057504 A | 5/2016 |
| WO | 2008/019487 A1 | 2/2008 |

* cited by examiner

METHOD FOR OBTAINING BIOMETRIC INFORMATION AND ELECTRONIC DEVICE THEREOF

CROSS-REFERENCE TO RELATED APPLICATION(S)

This application is based on and claims priority under 35 U.S.C. § 119 to Korean Patent Application No. 10-2017-0133121, filed on Oct. 13, 2017, in the Korean Intellectual Property Office, the disclosure of which is incorporated by reference herein in its entirety.

BACKGROUND

1. Field

Various embodiments of the present disclosure relate to an apparatus and method for obtaining biometric information by using a display as a light source in an electronic device.

2. Description of Related Art

With the growth of information and communication technology and semiconductor technology, various electronic devices are developing into multimedia devices providing various multimedia services. For example, the multimedia service can include at least one of a voice call service, a message service, a broadcasting service, a wireless Internet service, a camera service, an electronic payment service or a music play service.

As the multimedia service of the electronic device becomes diversified, private information stored in the electronic device is increasing. The electronic device can provide an authentication service for protecting the private information stored in the electronic device from others. For example, the electronic device can provide an authentication service to prevent unauthorized access to the electronic device by other users.

The above information is presented as background information only to assist with an understanding of the present disclosure. No determination has been made, and no assertion is made, as to whether any of the above might be applicable as prior art with regard to the present disclosure.

SUMMARY

To obtain a fingerprint image for user authentication, an electronic device can mount a fingerprint sensor in a partial region of a display having a spontaneous emission device such as an organic light emitting diode. The fingerprint sensor mounted in the partial region of the display can obtain the fingerprint image by using light outputted from the display.

To increase a fingerprint recognition rate, the electronic device can increase a luminance of a partial region of the display providing light to the fingerprint sensor compared to a luminance of the remaining region of the display, or use a light source image of a specific color. However, because the lives of light emitting elements disposed in the display are identical with each other, when the display is used continuously, the partial region of the display can be in fast progress of degradation compared to the remaining region of the display. In accordance with a degradation speed difference, a luminance difference or color deviation between the partial region and the remaining region can occur. This can be acknowledged as an afterimage to a user. Also, as a use time increases, a luminance of a light source part gradually decreases and accordingly, a sensitivity of the fingerprint sensor can deteriorate and thus the performance of the fingerprint sensor can gradually deteriorate. Therefore, higher luminance than necessary may have to be applied, in consideration of degradation. In that case, there is a danger of unnecessarily emitting too much light and accelerating the degradation. Therefore, as time goes, the luminance is increased as much as gradual degradation, whereby a specific performance can be guaranteed as a light source and even the degradation can be minimized. The control of the luminance is implemented by the control of data (i.e., a gradation value), so it can be controlled more conveniently than controlling the entire panel driving voltage.

Various embodiments of the present disclosure may provide an apparatus and method for compensating or retarding a degradation of a display providing light to a fingerprint sensor in an electronic device.

According to various embodiments of the present disclosure, an electronic device comprises a display comprising a plurality of pixels, a biometric sensor disposed in at least a partial region of the display; and at least one processor, wherein the at least one processor is configured to receive an input for sensing biometric information of an external object, in response to the input, select at least one pixel among a first pixel and a second pixel in accordance with history information about use of the first pixel and second pixel, wherein the first pixel and the second pixel are disposed in the at least the partial region of the display proximate to the biometric sensor and obtain the biometric information of an external object through the biometric sensor by using light irradiated by the selected at least one pixel.

According to various embodiments, an electronic device comprises a display comprising a first region and a second region, a biometric sensor disposed in the second region of the display, and at least one processor, wherein the at least one processor is configured to identify the occurrence of a biometric information acquisition event, identify at least one of an electronic device use time or a biometric information acquisition history, set a value of the second region, based on at least one of the electronic device use time or the biometric information acquisition history, set a luminance of the second region, based on the set value of the second region, and obtain biometric information through the biometric sensor by using light outputted from the display, based on the set luminance of the second region.

Accordingly to various embodiments, an electronic device comprises a display comprising a first region and a second region, a biometric sensor disposed in a second region of the display, and at least one processor, wherein the at least one processor is configured to identify the occurrence of a biometric information acquisition event, identify a plurality of pixel groups disposed in the second region and a biometric information acquisition history, identify at least one pixel group among the plurality of pixel groups, based on the biometric information acquisition history, and obtain biometric information through the biometric sensor by using light outputted from the identified pixel group.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Various embodiments of the present disclosure are mentioned below in detail with reference to the accompanying drawings. And, in describing various embodiments of the present disclosure, related well-known functions or constructions are not described in detail for clarity and simplicity, since they would obscure the gist of the invention in unnecessary detail. And, the terms described below are defined considering functions in the present disclosure, and may be modified in accordance to user and operator's intention or practice. Therefore, the definition should be given on the basis of the content throughout the present specification.

FIG. 1A to FIG. 1E illustrate schematic structures of an electronic device according to various embodiments of the present disclosure.

Figure 1A:
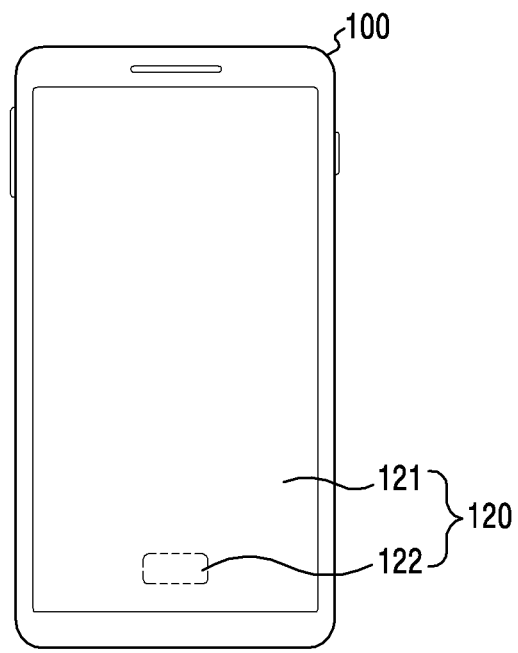
FIG. 1A, FIG. 1B, FIG. 1C, FIG. 1D and FIG. 1E illustrate schematic structures of an electronic device according to various embodiments of the present disclosure.

Referring to FIG. 1A, the electronic device 100 may include a display 120. For example, the display 120 may include a first region 121 and a second region 122.

According to an embodiment, the display 120 may be used for data output, and may be used as an obtaining member for obtaining biometric information. For example, the display 120 may include a biometric sensor (e.g., a fingerprint sensor) for obtaining user's biometric information (e.g., fingerprint information). In this case, the biometric sensor may be disposed in the second region 122 of the display 120, and the second region 122 may be utilized as a region for sensing biometric information. Accordingly, because the display 120 is used for a biometric information sensing function, a user may make contact with the second region 122. The electronic device 100, thereby getting biometric information recognized by the electronic device 100. For example, the display 120 may use at least one sub pixel included in each pixel of the display 120, as a light source of the biometric sensor. Light provided from the display 120 is used for measuring or detecting (now collectively referred to as measuring) biometric information (e.g., a fingerprint image, a blood flow rate, etc.) of the human body making in contact with the display 120. The light is reflected of the part of the human body making contacted with the display 120. The biometric sensor receives the light and measures the biometric information.

According to an embodiment, a biometric sensor for obtaining biometric information may be disposed at a lower end of a partial region (e.g., the second region 122) of the display 120. For instance, the biometric sensor disposed at the lower end of the display 120 may obtain user's biometric information through the partial region (e.g., the second region 122) of the display 120. It is noted that in certain embodiments, the display 120 can reconfigure to a variety of orientations, including horizontal. For purposes of this document, the lower end of the display shall be considered that portion of the display that is proximate to a telephone microphone of the electronic device. The electronic device 100 is commonly held so that the telephone microphone is at the bottom. When texting or entering alphanumeric input, a keyboard usually appears on the display directly above the telephone microphone and the device is typically held such that the fingers. Therefore, when held in a typical configuration, the fingers are positioned to easily touch second region 122. For instance, light irradiated from a light source (e.g., a pixel) of the display 120 is irradiated outside the display 120 and then, the irradiated light is reflected from an external object (e.g., user's finger) outside the display 120 and is introduced into the display 120. At this time, the biometric sensor may obtain the introduced reflected light, to provide image information about the external object.

According to an embodiment, although not illustrated in the drawing, the electronic device 100 may include a separate hardware button (e.g., a home button). For example, even in response to the electronic device 100 utilizing the display 120 as the biometric sensor, the electronic device 100 may include the separate hardware button in the same surface as a surface in which the display 120 is disposed in the electronic device 100.

According to an embodiment, the entire region of the display 120 may be utilized as a region for sensing biometric information. For example, the electronic device 100 may sense biometric information in the first region 121 of the display 120. Accordingly, in response to the display 120 being used for a biometric information sensing function, although a user gets in contact with any one of the display region, a user's fingerprint may be recognized. In this case, the biometric sensor may be disposed in the entire display 120 region, and the electronic device 100 may activate a biometric sensor disposed in the display 120 region where the biometric information is sensed, and may inactivate a biometric sensor disposed in the remaining display 120 region.

Figure 1B:
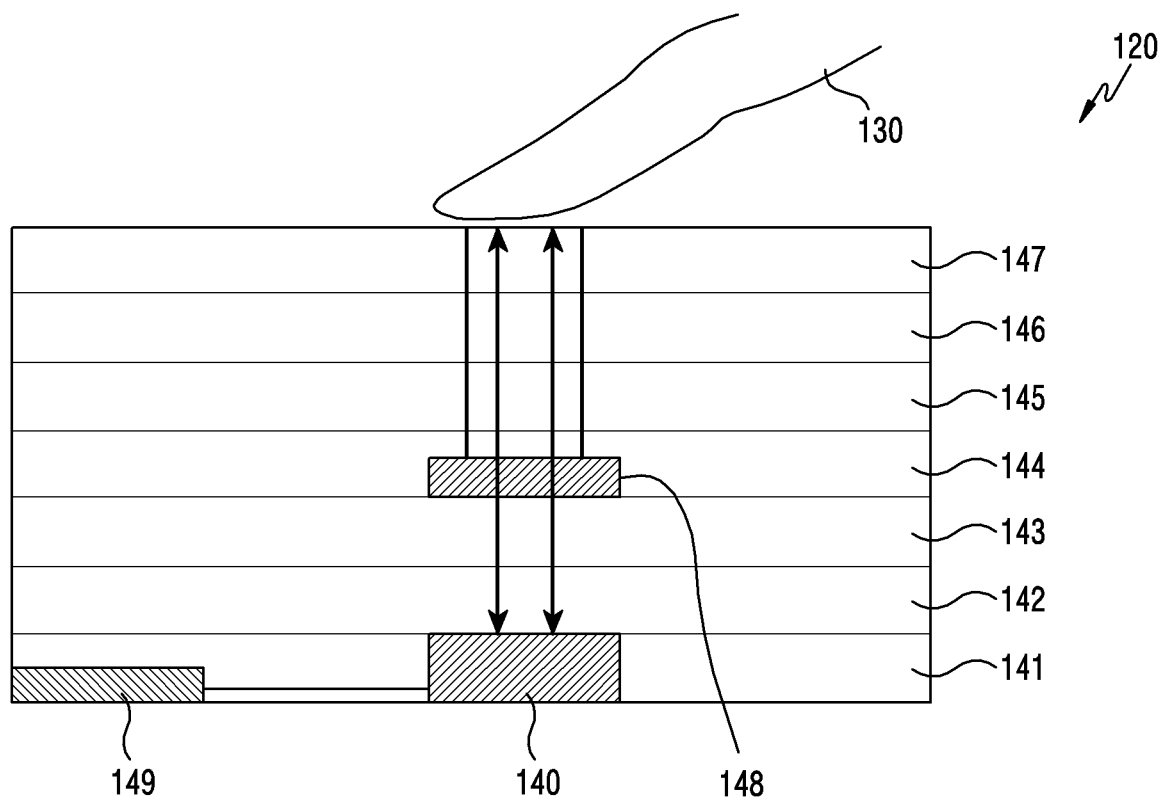

Referring to FIG. 1B, the display 120 may include a biometric sensor (e.g., a light receiving element 140 and a sensor driver integrated circuit (IC) 149), an opaque layer 141, a polymer film 142, a thin film transistor substrate 143, a light emitting element layer (e.g., an organic light emitting display (OLED) layer) 144, a touch sensor 145, a polarization film 146, a window 147, and an optical filter 148.

According to an embodiment, the biometric sensor may be disposed within the display 120. For example, the biometric sensor may be disposed in a bottom surface (i.e., furthest below the display surface) of the display 120. For instance, at least a part (e.g., an upper part of a biometric sensor module including the light receiving element 140) of the biometric sensor may be disposed within the opaque layer 141. Or, unlike illustrated, the biometric sensor may be disposed beneath the opaque layer 141, or may be disposed within the polymer film 142, the thin film transistor substrate 143, the light emitting element layer 144, the touch sensor 145, the polarization film 146, or the window 147, or between them. The biometric sensor may not include a separate light source, and may use light outputted from the light emitting element layer 144.

According to an embodiment, the biometric sensor may include at least one of a fingerprint sensor, a heart rate sensor, a stress sensor, an oxygen saturation sensor, a blood pressure sensor, a blood glucose sensor, or a skin tone sensor.

According to an embodiment, the biometric sensor may obtain biometric information. For example, the biometric information may include information related with at least one of a user's heart rate, stress index, fingerprint, oxygen saturation, blood pressure, blood glucose, or skin tone.

According to an embodiment, the biometric sensor may include the light receiving element (e.g., a photo diode) 140 and the sensor driver IC 149. For instance, the light receiving element 140 may sense light reflected from the user body (e.g., a finger 130) getting in contact with the display 120, to obtain biometric information (e.g., a fingerprint image or picture). As an example, the reflected light may be light that light caused by the driving of the display 120 is reflected from the body. For example, the sensor driver IC 149 may forward the biometric information obtained through the light receiving element 140, to the processor.

Opaque Layer 141—According to an embodiment, the opaque layer 141 may be disposed in a bottom surface of the display 120. For example, the opaque layer 141 may at least partially relieve an external shock applied to the electronic device 100 or a shock applied to the bottom surface of the display 120.

Polymer Film 142—According to an embodiment, the polymer film 142 may be disposed between the thin film transistor substrate 143 and the opaque layer 141. For example, the polymer film 142 may increase a strength of the electronic device 100, and may output, to the external, a heat provided from the electronic device 100. For example, the polymer film 142 may include any one selected among polycarbonate (PC), polymethyl methacrylate (PMMA), polyimide (PI), polyethylene terephthalate (PET), polypropylene terephthalate (PPT), amorphous polyethylene terephthalate (APET), polyethylene naphthalate terephthalate (PEN), polyethylene terephthalate glycol (PETG), tri-acetyl-cellulose (TAC), cyclic olefin polymer (COP), cyclic olefin copolymer (COC), polydicyclopentadiene (DCPD), cyclopentdienyl anions (CPD), polyarylate (PAR), polyethersulfone (PES), poly ether imide (PEI), modified epoxy resin or acrylic resin, or a combination of two or more.

Film Transistor Substrate 143—According to an embodiment, the thin film transistor substrate (e.g., a low temperature polycrystalline silicon (LTPS) substrate) 143 may be disposed between the light emitting element layer 144 and the polymer film 142. For example, the thin film transistor substrate 143 may include a thin film transistor (TFT) that drives the light emitting element layer 144, etc.

Light Emitting Element Layer 144—According to an embodiment, the light emitting element layer (e.g., the organic light emitting diode (OLED) layer) 144 may be disposed between the thin transistor substrate 143 and the touch sensor 145. For example, the light emitting element layer 144 may include a pixel electrode, an organic light emitting layer, a common electrode, etc. For instance, the organic light emitting layer may include a red light emitting layer, a green light emitting layer, and a blue light emitting layer.

Touch Sensor Panel 145—According to an embodiment, the touch sensor (e.g., a touch screen panel (TSP)) 145 may be disposed between the light emitting element layer 144 and the polarization film 146. For example, the touch sensor 145 may sense a user's touch input. The touch sensor 145 may be driven in a capacitive overlay scheme, a resistive overlay scheme, an infrared beam scheme, an electromagnetic induction scheme, etc. Besides the above schemes, all kinds of schemes capable of sensing a contact or pressure of an object may be used for the touch sensor 145. The touch sensor 145 may sense the existence or non-existence of a user's touch input and a location of a point where a touch occurs, and forward corresponding information to a touch sensor circuit (not shown).

Polarization Film 146—According to an embodiment, the polarization film 146 may be disposed between the touch sensor 145 and the window 147. For example, to increase an acknowledgement quality, the polarization film 146 may minimize the reflection of external light.

Window 147—According to an embodiment, the window 147 may be disposed on the polarization film 146. For example, the window 147 may protect an internal construction of the electronic device 100, and may include a front plate, a glass plate or the like.

Optical Filter 148—According to an embodiment, the optical filter 148 may be disposed in at least a part of the light emitting element layer 144, and may be disposed directly above or over the light receiving element 140. For example, the optical filter 148 may filter out all light except a visible ray of a specific wavelength that is recognizable in the light receiving element 140. For instance, the optical filter 148 may be manufactured using materials having a black tinge, and may prevent the biometric sensor from being observable by a user. Furthermore, the optical filter 148 may be disposed on a path via which light reflected from the user's body travels to the light receiving element 140, at the inside of the light emitting element layer 144.

Figure 1C:
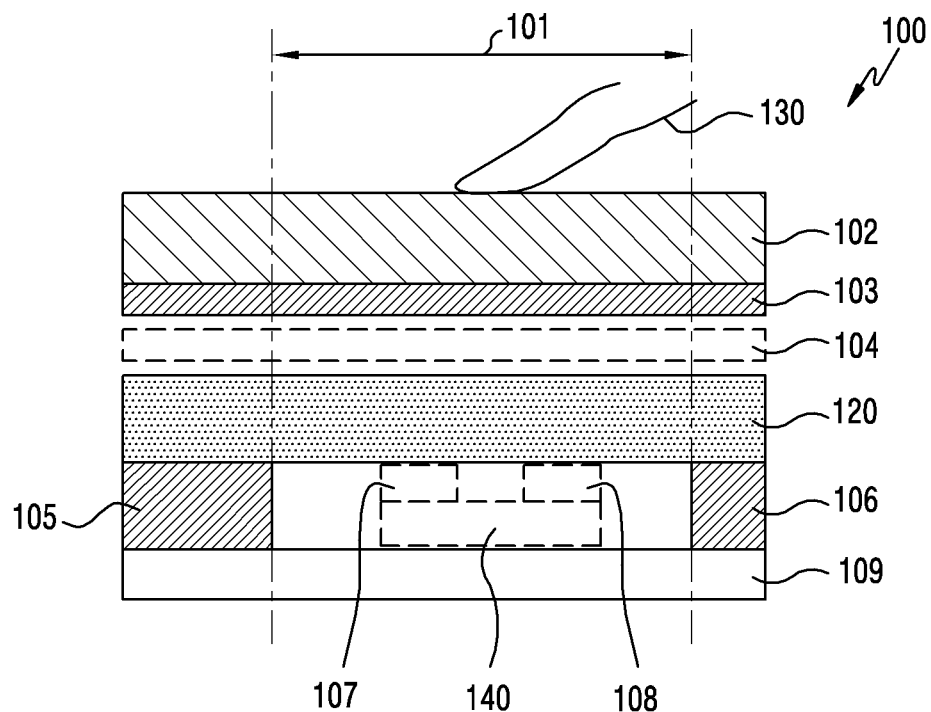

FIG. 1C is an example of a mounting structure of the biometric sensor (i.e., the light receiving element 140 and the sensor driver IC 149) (e.g., fingerprint sensor) for sensing user's biometric information through the display 120 (e.g., the second region 122 of FIG. 1A) of the electronic device 100. According to an embodiment, the biometric sensor (i.e., the light receiving element 140 and the sensor driver IC 149) may be implemented in a capacitive overlay scheme by forming a sensing electrode on the display 120 (e.g., forming on a separate layer 104 on the display 120, or directly forming on an upper surface of the display 120, or the like). According to another embodiment, the biometric sensor may be implemented in an ultrasonic scheme by disposing an ultrasonic transceiver in the layer 104.

According to another embodiment, the electronic device 100 may include the biometric sensor (i.e., the light receiving element 140 and the sensor driver IC 149) beneath the display 120. According to an embodiment, the biometric sensor (i.e., the light receiving element 140 and the sensor driver IC 149) may be comprised of an optical biometric sensor for sensing user's biometric information by using, as a light source, light outputted from the display 120 (e.g., light outputted from a Red, Green or Blue pixel of the display 120 or using a light source (e.g., an IR, a LED, etc.) separately implemented within the display 120). The electronic device 100 may include shock absorption parts 107 and 108 between the biometric sensor (i.e., the light receiving element 140 and the sensor driver IC 149) and the display 120 so as to protect the biometric sensor (i.e., the light receiving element 140 and the sensor driver IC 149).

According to various embodiments, the electronic device 100 may include the biometric sensor (i.e., the light receiving element 140 and the sensor driver IC 149) in at least partially specified region (e.g., a fingerprint sensing region 101) of the display 120, to sense user's biometric information through the specified region. According to various embodiments, the fingerprint sensing region 101 may be the second region 122 of FIG. 1A. According to various embodiments, the specified region may be the entire region (e.g., an activation region) of the display 120.

According to various embodiments, the electronic device 100 may obtain a user's touch input by controlling the biometric sensor, without including a separate touch sensor.

Figure 1D:
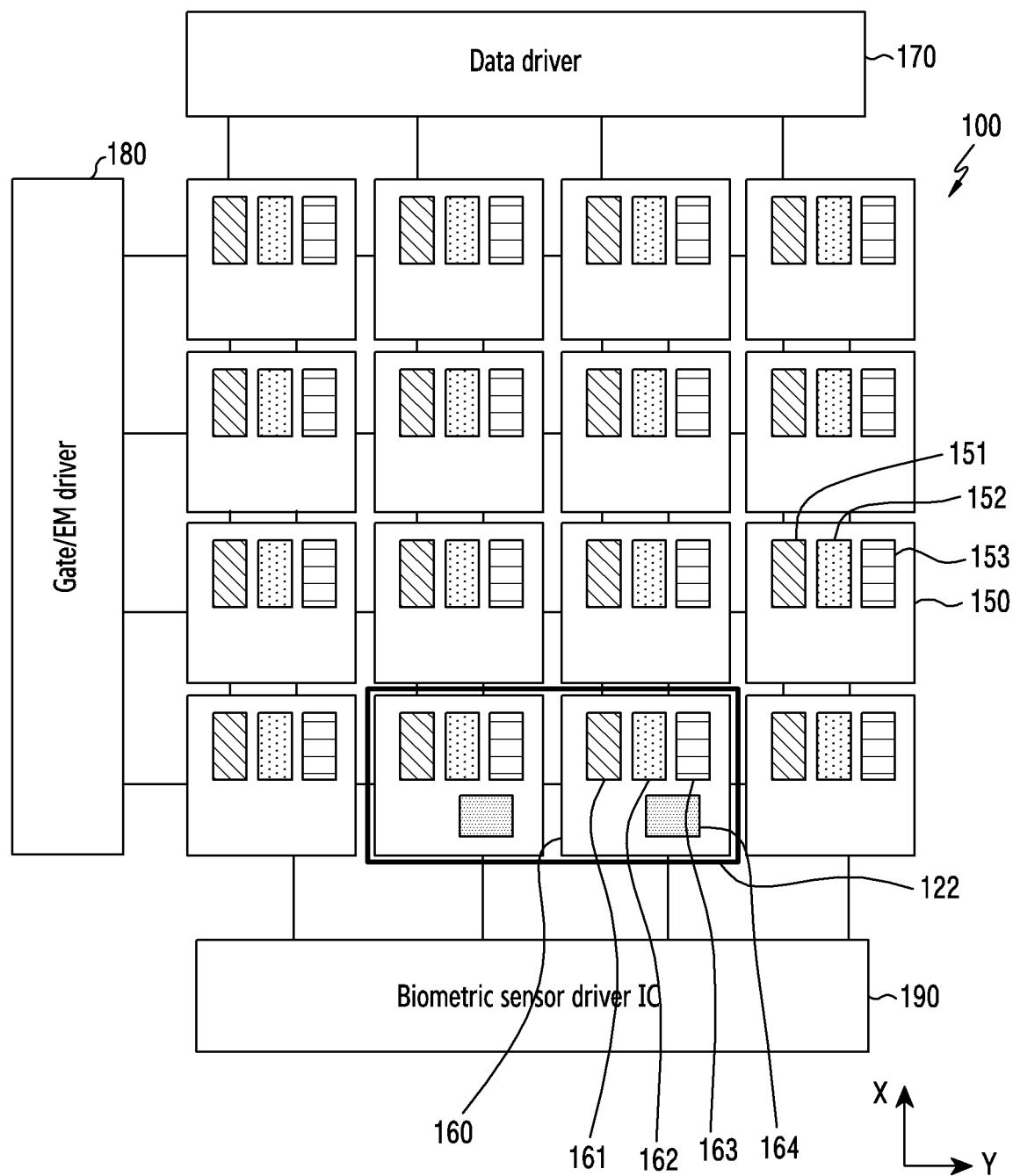
Figure 1E:
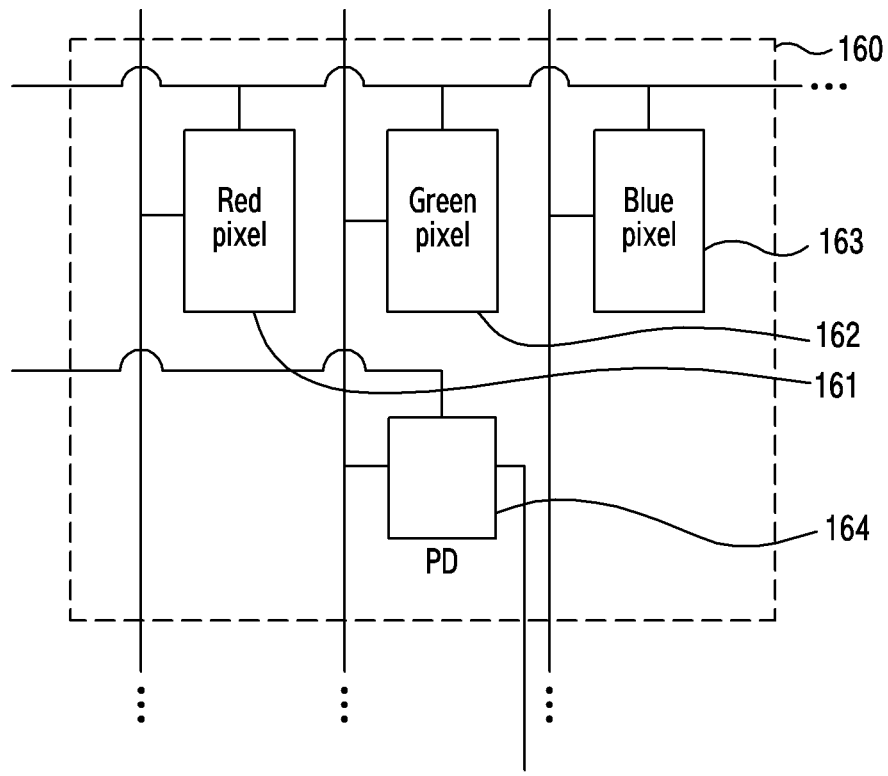

Referring to FIG. 1D and FIG. 1E, the electronic device 100 may include a plurality of pixels. It is noted that pixel can refer to either the smallest element of a display capable of emitting a full range of colors, or the smallest element of picture. As used herein, pixel shall refer to the smallest element of display capable of emitting a full range of colors. For example, a pixel 150 disposed in the first region (121 of FIG. 1A) may include a first sub pixel 151 outputting light of a first color, a second sub pixel 152 outputting light of a second color, and a third sub pixel 153 outputting light of a third color. A pixel 160 disposed in the second region 122 may include a first sub pixel 161 outputting light of a first color, a second sub pixel 162 outputting light of a second color, a third sub pixel 163 outputting light of a third color, and a light receiving element 164 receiving external light. As an example, to obtain biometric information in the second region 122 of the display (120 of FIG. 1A), the light receiving element 164 may be disposed in the pixel 160 disposed in the second region 122.

According to an embodiment, a processor may select at least one pixel, such as pixel 160 or the another pixel in the second region 122 based on history information about the user of pixel 160 and the other pixel in the second region 122. The selected pixel irradiates light, which is reflected from the human body part (such as finger) and received by a biometric sensor such as light receiving element 164. The processor can obtain biometric information of the human body part from the biometric sensor.

According to an embodiment, though not illustrated in the drawing, the light receiving element 164 may be disposed in all the pixels 150 and 160. For instance, the electronic device 100 may inactivate the light receiving element 164 disposed in the first region 121, and may activate the light receiving element 164 disposed in the second region 122. Also, as an example, in response to the second region 122 being changed into another region of the display 120, the electronic device 100 may activate the light receiving element 164 of the changed second region 122, and may inactivate the light receiving element 164 of the original second region 122.

According to an embodiment, the electronic device 100 may obtain biometric information in the entire region of the display 120. For instance, the light receiving element 164 may be disposed in all the pixels 150 and 160 of the display 120, and the electronic device 100 may activate the light receiving element 164 corresponding to a point where a user's touch is obtained, and may obtain user's biometric information by using the activated light receiving element 164.

According to an embodiment, the electronic device 100 may dispose the light receiving element 164 at a lower end of the display 120. For instance, the light receiving element 164 may be located at a lower end of the second region 122 of the display 120, to obtain user's biometric information.

According to an embodiment, a plurality of pixels may be arranged in a matrix form, and the number of pixels disposed in a first direction (X) and a second direction (Y) may be identified according to a resolution of the electronic device 100. For instance, the first direction (X) may be a long direction of the electronic device 100, and the second direction (Y) may be a short direction of the electronic device 100 that is substantially perpendicular to the first direction (X).

According to an embodiment, the first sub pixels 151 and 161 to the third sub pixels 153 and 163 may output, as illustrated in FIG. 1E, light of mutually different first color to third color. For example, the first sub pixels 151 and 161 may output red (R) light, and the second sub pixels 152 and 162 may output green (G) light, and the third sub pixels 153 and 163 may output blue (B) light.

According to an embodiment, at least one sub pixel among the first sub pixels 151 and 161 to the third sub pixels 153 and 163 may output infrared light. For example, the light receiving element 164 may sense the infrared light outputted form the sub pixel.

According to an embodiment, the electronic device 100 may apply a power source to the first sub pixels 151 and 161 to the third sub pixels 153 and 163 through a gate driver (or emission driver) 180, to control a light emitting timing of each sub pixel. By providing a data value by each pixel 150 or 160, a data driver 170 may control to display an inherent color and brightness by each pixel 150 or 160. Each pixel 150 or 160 may express an inherent color by means of the first sub pixels 151 and 161 to the third sub pixels 153 and 163.

According to an embodiment, the light receiving element 164 may collect light which is introduced from the external or is reflected from an external object (e.g., a finger, etc.) approaching the electronic device 300. For example, the light receiving element 164 may include an optical filter (e.g., the optical filter 148 of FIG. 1B) for filtering light of a specified wavelength band, to obtain a light amount of the light of the specified wavelength band filtered through the optical filter 148. As an example, the light receiving element 164 may perform a fingerprint recognition function by obtaining mutually different light amounts which are reflected from a ridge of the user's finger and a valley between the ridges. As an example, the light receiving element 164 may perform a biometric recognition function by obtaining a light amount which is reflected by a blood flow rate of the user's human body. As an example, as in FIG. 1E, the light receiving element 164 may include a photo diode (PD).

According to an embodiment, the light receiving element 164 may recognize light emitting timings of the sub pixels 151 to 163, based on power supply information of the gate driver 180. Light information collected in the light receiving element 164 may be forwarded to a biometric sensor driver IC 190.

According to various embodiments of the present disclosure, the pixel disposed in the electronic device 100 may include a set of sub pixels constructed in the form of red green blue green (RGBG), red green blue yellow (RGBY) or red green blue white (RGBW).

Figure 2A:
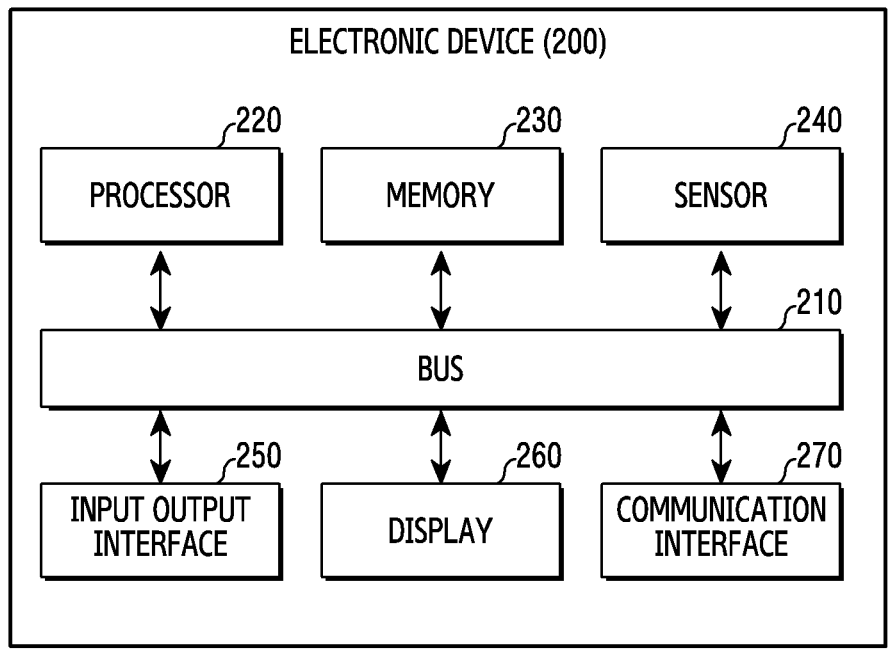
FIG. 2A and FIG. 2B illustrate block diagrams of an electronic device according to various embodiments of the present disclosure.
Figure 2B:
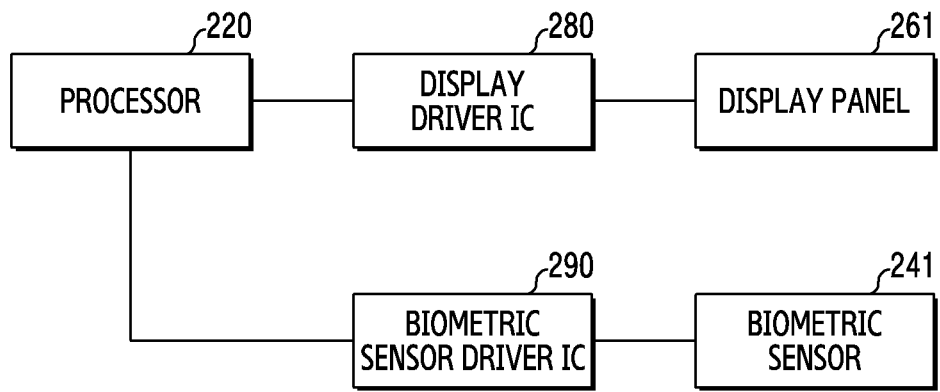

FIG. 2A and FIG. 2B illustrate block diagrams of an electronic device according to various embodiments of the present disclosure. In the following description, the electronic device 200 may include the whole or at least part of the electronic device 100 of FIG. 1A to FIG. 1E.

Referring to FIG. 2A and FIG. 2B, the electronic device 200 (e.g., the electronic device 100 of FIG. 1A) may include a bus 210, a processor 220, a memory 230, a sensor 240, an input output interface 250, a display 260 (e.g., the display 120 of FIG. 1A) and a communication interface 260. In some embodiment, the electronic device 200 may omit at least one of the constituent elements or additionally have another constituent element.

The bus 210 may, for example, include a circuitry coupling the constituent elements 220 to 270 with one another and forwarding a signal (e.g., a control message and/or data) between the constituent elements 220 to 270.

The processor 220 may execute operation or data processing for control and/or communication of at least one another constituent element of the electronic device 200. For example, the processor 220 may include one or more of a central processing unit (CPU), an application processor (AP), a communication processor (CP), a touch sensor IC, or an image signal processor (ISP).

According to an embodiment, the processor 220 may include one or more of a display driver integrated circuit (DDI) or a biometric sensor IC. For example, the processor 220 may control a display panel 261 and a biometric sensor 241.

Alternatively, as in FIG. 2B, the processor 220 may be separate from the display driver IC 280 and/or biometric sensor driver IC 290.

According to an embodiment, the processor 220 may include a low power processor. For example, in response to the processor 220 being in a sleep state, the electronic device 200 may process biometric information obtained by the biometric sensor 241 and user input information obtained by the display panel 261, by using the low power processor, without waking up the processor 220.

According to an embodiment, the processor 220 may include a biometric information data accumulating module (not shown). For example, the processor 220 may identify a user's biometric information (e.g., fingerprint information) acquisition history through the biometric information data accumulating module.

According to an embodiment, the processor 220 may identify the occurrence of a biometric information acquisition event. For example, in response to an external object (e.g., a finger) being obtained in the second region (122 of FIG. 1A), the processor 220 may identify that the biometric information acquisition event takes place.

According to an embodiment, the processor 220 may identify an electronic device 200 use time and a biometric information (e.g., finger) acquisition history. For example, from the foregoing the processor 220 may identify a use time ranging from an ongoing time point at which a user primarily uses the electronic device 200. For instance, the processor 220 may identify the existing accumulated biometric information acquisition information.

According to an embodiment, the processor 220 may set a gradation value of the second region 122, based on at least one of the electronic device 200 use time and the biometric information acquisition history. For example, the processor 220 may set the gradation value as applying a compensation variable to a previously given gradation value based on the electronic device 200 use time. For instance, the processor 220 may set the gradation value in consideration of an accumulated biometric information acquisition recursion ("biometric information acquisition recursion" may include a number of times that the biometric information has been acquired).

According to an embodiment, the processor 220 may emit light from the display 260, based on the set gradation value. For example, the processor 220 may display, on the display 260, an image which is provided based on the set gradation value, and may provide the biometric sensor 241 with light outputted from the second region 122.

According to an embodiment, the processor 220 may obtain biometric information by using light outputted from the display 260. For example, the processor 220 may receive light which is outputted in the second region 122 and is reflected from the body of a user, by using the biometric sensor 241, and may analyze the collected light, to obtain biometric information (e.g., a user fingerprint).

According to an embodiment, the processor 220 may perform user authentication, based on the obtained biometric information. For example, the processor 220 may compare the obtained user's biometric information and previously stored user's reference biometric information, to identify whether a person inputting the biometric information is consistent with a user of the electronic device 200.

According to an embodiment, the processor 220 may identify a plurality of pixel groups and a biometric information acquisition history. For example, the processor 220 may identify a plurality of regions included in the second region 212 of the display 260 which overlaps with the biometric sensor 241. For instance, the processor 220 may identify a first pixel group disposed in an even-numbered column and a second pixel group disposed in an odd-numbered column among a plurality of pixels disposed in the second region 212.

According to an embodiment, the processor 220 may identify a pixel group, based on the biometric information (e.g., fingerprint) acquisition history. For example, the processor 220 may identify a pixel group of which the light emitting recursion is least, based on the fingerprint acquisition history. Also, according to an embodiment, the processor 220 may identify a pixel group corresponding to a sequence that will be driven in response to sensing a user touch input, as a pixel group that will provide light to the biometric sensor 241.

According to an embodiment, the processor 220 may obtain biometric information by using light outputted from the identified pixel group. For example, the processor 220 may obtain the biometric information by using light outputted from a pixel group of which the light emitting recursion is least, based on the fingerprint acquisition history.

According to an embodiment, the processor 220 may perform user authentication, based on biometric information. For example, by comparing the obtained user's biometric information and previously stored user's reference biometric information, the processor 220 may identify whether a person inputting the biometric information is consistent with a user of the electronic device 200.

The memory 230 may include a volatile and/or non-volatile memory. For example, the memory 230 may store a command or data related to at least one another constituent element of the electronic device 200. The data may include reference biometric information (e.g., a fingerprint image, a biometric change pattern, etc.) which is defined for user authentication. For instance, the memory 230 may include a general region for storing a user application, etc. and a security region for storing information (e.g., fingerprint acquisition information) sensitive to security. Meantime, the electronic device 200 may include a security element, which will store information sensitive to security, as a construction separate from the memory 230.

The sensor 240 may, for example, obtain user's biometric information or measure a physical quantity or sense an activation state of the electronic device 200, to convert obtained, measured or sensed information into an electric signal. The sensor 240 may, for example, include at least one of a touch sensor, a grip sensor, a proximity sensor, a color sensor (e.g., red, green, blue (RGB) sensor), the biometric sensor 241, an illumination sensor, or an infrared (IR) sensor.

The input output interface 250 may forward a command or data inputted from a user or another external device, to the other constituent element (s) of the electronic device 200. For example, the input output interface 250 may include at least one physical button such as a home button, a power button, a volume control button and the like. The input output interface 250 may output a command or data received from the other constituent element(s) of the electronic device 200, to the user or another external device.

The display 260 may display various contents (e.g., a text, an image, a video, an icon, a symbol and/or the like) to a user. For example, the display 260 may include a touch screen. The display 260 may receive a touch, gesture, proximity or hovering input that utilizes an electronic pen or part of the user's body.

According to an embodiment, the display 260 may obtain biometric information about part of the human body of a user getting in contact with the display 260. For example, the display 260 may output light through at least one sub pixel corresponding to biometric information for obtaining from the electronic device 200 among a plurality of sub pixels (red, green, blue) constituting at least one pixel of the display 260. The display 260 may collect light reflected from part of the human body through a light receiving element, to obtain user's biometric information (e.g., fingerprint image).

The communication interface 270 may establish a communication between the electronic device 200 and an external device (e.g., an external electronic device or a server). For example, the communication interface 270 may be coupled to a network through wireless communication or wired communication, to communicate with the external device. For example, the communication interface 270 may communicate with the external device through short-range communication.

A display driver IC 280 may, for example, transmit a driving signal (e.g., a driver driving signal, a gate driving signal, etc.) to the display panel 261, based on image information received form the processor 220. For example, in response to a biometric information acquisition event occurring, the display driver IC 280 may drive the display panel 261, to provide light to the biometric sensor 241.

The display panel 261 may, for example, display various contents (e.g., a text, an image, a video, an icon, a symbol and/or the like) to a user. According to an embodiment, the display panel 261 may include a liquid crystal display (LCD), a light emitting diode (LED) display, an organic light emitting diode (OLED) display, or a microelectromechanical systems (MEMS) display, or an electronic paper display. For example, the display panel 261 may, for example, be implemented to be flexible, transparent, or wearable. Also, the display panel 261 may be included in a cover of a case which is electrically coupled with the electronic device 200, too.

A biometric sensor driver IC 290 may, for example, transmit or receive a signal (e.g., a transmitted signal (TX), a received signal (RX), a stimulus signal (shield), etc.) with the biometric sensor 241. As an example, the biometric sensor driver IC 290 may obtain user's biometric information, based on a signal transmitted and/or received with the biometric sensor 241. For instance, the biometric sensor driver IC 290 may be disposed within the display 260.

According to an embodiment, the biometric sensor driver IC 290 may control the display 260 to emit light from the display 260, and may obtain user's biometric information by using the light outputted from the display 260.

The biometric sensor 241 may, for example, sense user's biometric information. For example, the biometric information may include a user's heart rate, stress index, fingerprint, oxygen saturation, blood pressure, blood glucose, skin tone or the like. As an example, the biometric sensor 241 may collect light which is introduced from the external or is reflected from an external object (e.g., finger, etc.) approaching the electronic device 200, and may analyze the collected light to obtain user's biometric information (e.g., fingerprint information). For instance, the biometric sensor 241 may be disposed within the display 260, and may obtain biometric information related with the user's body that approaches the display 260. As an example, the biometric sensor 241 may include at least one of a fingerprint sensor, a heart rate sensor, a stress sensor, an oxygen saturation sensor, a blood pressure sensor, a blood glucose sensor, or a skin tone sensor.

According to various embodiments of the present disclosure, an electronic device may include a display including a plurality of pixels, a biometric sensor disposed in a lower part of the display or at least partial region of the display, and a processor. The processor may be configured to receive an input for sensing biometric information of an external object, and in response to the input, select at least one pixel among a first pixel and a second pixel in accordance with history information about use of the first pixel and second pixel included in a region of the display corresponding to the biometric sensor among the plurality of pixels, and obtain the biometric information of the external object through the biometric sensor by using light outputted through the selected at least one pixel.

According to various embodiments, the processor may be configured to identify the properties of a plurality of sub pixels which are included in the region of the display corresponding to the biometric sensor, and select at least one sub pixel among the plurality of sub pixels, based on the identified properties of the plurality of sub pixels.

According to various embodiments, the properties of the plurality of sub pixels may include at least one of a color of light outputted from the sub pixel, a service life of the sub pixel, or a time of use of the sub pixel.

According to various embodiments, the processor may be configured to set a value of the region of the display corresponding to the biometric sensor, based on the identified properties of the plurality of sub pixels, and set a luminance of the display region corresponding to the biometric sensor, based on the set value of the display region corresponding to the biometric sensor, and emit light from the selected at least one sub pixel, based on the set luminance.

According to various embodiments, the processor may be configured to identify a service life of a sub pixel included in the display region corresponding to the biometric sensor, and identify whether a sub pixel having a service life less than a threshold value exists, and in response to the sub pixel having the service life less than the threshold value existing, refine a gradation value of the sub pixel, based on the identified service life.

According to various embodiments, the processor may be configured to obtain the biometric information, based on at least part of light that the outputted light is reflected from the external object and then transmits the display.

According to various embodiments of the present disclosure, an electronic device may include a display including a first region and a second region, a biometric sensor disposed in a lower part of the display or the second region of the display, and a processor. The processor may be configured to identify the occurrence of a biometric information acquisition event, and identify at least one of an electronic device use time or a biometric information acquisition history, and set a value of the second region, based on at least one of the electronic device use time or the biometric information acquisition history, and set a luminance of the second region, based on the set value of the second region, and obtain biometric information through the biometric sensor by using light outputted from the display, based on the set luminance of the second region.

According to various embodiments, the biometric sensor may be disposed in the first region, and the processor may be configured to activate the biometric sensor disposed in the second region.

According to various embodiments, the processor may be configured to identify a service life of a sub pixel disposed in the second region, and identify whether a sub pixel having a service life less than a threshold value exists, and in response to the sub pixel having the service life less than the threshold value existing, refine a gradation value of the sub pixel, based on the identified service life.

According to various embodiments, the processor may be configured to identify a luminance of the first region and second region, and identify whether a difference of the luminance of the first region and second region is equal to or is greater than a threshold value, and in response to the difference of the luminance of the first region and second region being equal to or being greater than the threshold value, add an afterimage compensation frame, and emit light from the display, based on the added afterimage compensation frame.

According to various embodiments, the electronic device may further include an illumination sensor, and the processor may be configured to obtain ambient light around the electronic device by using the illumination sensor, and identify whether a difference of a color of the ambient light and a color of the first region exceeds a threshold value, and in response to the difference of the color of the ambient light and the color of the first region exceeding the threshold value, provide an afterimage compensation frame adjusting the color of the first region, and emit light from the display, based on the provided afterimage compensation frame.

According to various embodiments, the processor may be configured to identify that a biometric information acquisition event occurs as receiving an input for sensing biometric information of an external object.

According to various embodiments, the processor may be configured to obtain the biometric information, based on at least part of light that the outputted light is reflected from the external object and then transmits the display.

According to various embodiments, the biometric information acquisition history may include at least one of a biometric input time, a biometric input point, a biometric input sequence, a history of a pixel group in which biometric information is obtained among the plurality of pixel groups, or the number of times of light emission of the pixel group included in the plurality of pixel groups.

According to various embodiments of the present disclosure, an electronic device may include a display including a first region and a second region, a biometric sensor disposed in a lower part of the display or a second region of the display, and a processor. The processor may be configured to identify the occurrence of a biometric information acquisition event, and identify a plurality of pixel groups disposed in the second region and a biometric information acquisition history, and identify at least one pixel group among the plurality of pixel groups, based on the biometric information acquisition history, and obtain biometric information through the biometric sensor by using light outputted from the identified pixel group.

According to various embodiments, the biometric sensor may be disposed in the first region, and the processor may be configured to activate the biometric sensor disposed in the second region.

According to various embodiments, the biometric information acquisition history may include at least one of a biometric input time, a biometric input point, a biometric input sequence, a history of a pixel group in which biometric information is obtained among the plurality of pixel groups, or the number of times of light emission of the pixel group included in the plurality of pixel groups.

According to various embodiments, the processor may be configured to identify the properties of a plurality of sub pixels which are included in the second region of the display, and select at least one sub pixel among the plurality of sub pixels, based on the identified properties of the plurality of sub pixels.

According to various embodiments, the properties of the plurality of sub pixels may include at least one of a color of light outputted from the sub pixel, a service life of the sub pixel, or a time of use of the sub pixel.

According to various embodiments, the processor may be configured to identify that a biometric information acquisition event occurs as receiving an input for sensing biometric information of an external object, and obtain the biometric information, based on at least part of light that the outputted light is reflected from the external object and then transmits the display.

Figure 3:
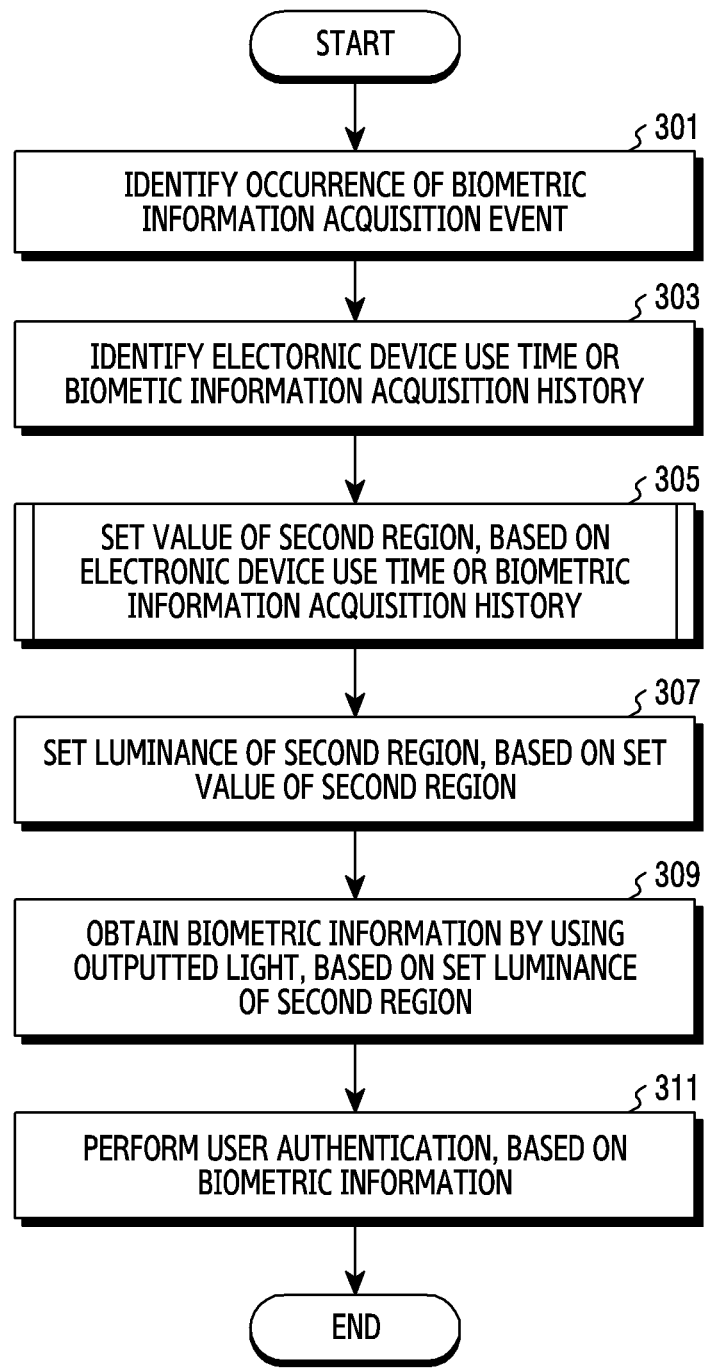
FIG. 3 illustrates a flowchart for obtaining biometric information, based on a set gradation value in an electronic device according to various embodiments of the present disclosure.

FIG. 3 illustrates a flowchart for obtaining biometric information, based on a set gradation value in an electronic device according to various embodiments of the present disclosure. In the following description, the electronic device may include the electronic device 200 of FIG. 2 or at least a part (e.g., the processor 220) of the electronic device 200.

Referring to FIG. 3, in operation 301, the electronic device 200 (e.g., the electronic device 100 of FIG. 1A) may identify the occurrence of a biometric information acquisition event. For example, in response to receiving an input for sensing biometric information of an external object (e.g., a finger) in the second region (122 of FIG. 1A), the processor 220 may identify that the biometric information acquisition event occurs. For instance, the biometric information acquisition event may include a user's touch input in the second region 122, a user input of activating a menu for performing user authentication, a biometric information input in course of lock screen displaying, or the like.

In operation 303, the electronic device 200 may identify at least one of an electronic device 200 use time or a biometric information (e.g., fingerprint) acquisition history. For example, the processor 220 may identify a use time ranging from a time point at which a user primarily uses the electronic device 200 to the present time. Herein, the use time may be a period of time counting from a date at which the user primarily uses the electronic device 200 to a current date. Also, unlike this, the use time may be a length of time for which the user actually powers "On" the electronic device 200, or may be a length of time for which the user activates a screen of the electronic device 200. For instance, the processor 220 may store user's biometric information acquisition information whenever obtaining user's biometric information (e.g., fingerprint), and may identify the accumulated user's biometric information acquisition history. Herein, the biometric information acquisition history may include at least one of a biometric input time, a biometric input point, a biometric input sequence, a history of a pixel group in which biometric information is obtained among the plurality of pixel groups, or the number of times of light emission of the pixel group included in the plurality of pixel groups.

In operation 305, the electronic device 200 may set a value of the second region 122, based on at least one of the electronic device 200 use time or the biometric information acquisition history, to adjust a brightness of the second region 122. For example, the processor 220 may set a gradation value of an image which will be displayed in the second region 122, based on at least one of the electronic device 200 use time and the biometric information acquisition history.

According to an embodiment, the electronic device 200 may set a gradation value of the second region 122, based on the electronic device 200 use time. For example, the processor 220 may set the gradation value as applying a compensation variable (a) to a previously given gradation value based on the electronic device 200 use time. For instance, the entire panel luminance may naturally decrease as time lapses (e.g., decrease of 20% for 2 years). As the second region 122 provides light to the biometric sensor (241 of FIG. 2B), a degradation of the second region 122 may proceed faster.

As the use time increases, an actual luminance (e.g., a luminance of light actually emitted from the display (260 of FIG. 2A)) of the second region 122 may be lower than a set luminance (i.e., a target luminance of light emitted from the display 260). Accordingly, the processor 220 may set the compensation variable (a) dependent on the electronic device 200 usage time. The usage time is estimated based on the degradation of the second region 122. The processor 220 may use the compensation variable (a), and may provide an image which will be displayed according to a gradation value.

For instance, the processor 220 may gradually increase the compensation variable (a) as the electronic device 200 use time increases, and may gradually increase even the gradation value (which may include a quantifiable value for reversing expected degradation, or a compensation value for expected degradation) as the compensation variable (a) gradually increases. As an example, as disclosed in Table 1, the processor 220 may set a compensation variable (a) corresponding to a use period (month) and a gradation value reflecting the compensation variable (a). The gradation value is the product of the compensation value and 255. A set luminance of the second region 122 may increase based on the set gradation value, and an actual luminance of the second region 122 may be maintained constant according to the set luminance increased by factoring the degradation of the second region 122. For instance, in response to a set luminance at 830, while having a gradation value of 230, the processor 220 may change the gradation value of yellow according to a use period, and the set luminance may be increased according to the changed gradation value, while the actual luminance may be constant as 830 even if the set luminance increases. Maintaining a luminance of a light source part identical may assist in maintain the specific performance of the fingerprint sensor.

TABLE 1

| Compensation variable (a) | Period (month) | Gradation value | Set luminance | Actual luminance |
|---|---|---|---|---|
| 0.9 | 1 | 230 | 830 | 830 |
| 0.91 | 4 | 232 | 870 | |
| 0.92 | 7 | 235 | 910 | |
| 0.93 | 10 | 237 | 950 | |
| 0.94 | 13 | 240 | 990 | |
| 0.95 | 16 | 242 | 1030 | |
| 0.96 | 19 | 245 | 1070 | |
| 0.97 | 22 | 247 | 1100 | |
| 0.98 | 26 | 250 | 1140 | |
| 0.99 | 29 | 252 | 1170 | |
| 1 | 36 | 255 | 1200 | |

According to an embodiment, the electronic device 200 may set a gradation value of the second region 122, based on a biometric information acquisition history instead of the period of month. For example, the processor 220 may set the gradation value in consideration of an accumulated biometric information acquisition recursion, and may increase a set luminance of the second region 122, based on the set gradation value, to maintain a constant actual luminance of the second region 122. For instance, the processor 220 may distinguish an accumulated value of a biometric information acquisition recursion in a specific unit (e.g., 90 times) in consideration of the degradation of the second region 122, and may change the gradation value whenever the biometric information acquisition recursion is accumulated in the specific unit.

According to an embodiment, the electronic device 200 may set a gradation value in consideration of all of the electronic device 200 use time and the biometric information acquisition history. For example, while the processor 220 sets the gradation value according to the electronic device 200 use time, in response to a biometric information acquisition recursion being accumulated more than a specific number of times, the processor 220 may reset the gradation value by granting a weight to a compensation variable (a). For instance, in contrast, while the processor 220 sets the gradation value based on the biometric information acquisition history, whenever the electronic device 200 use time exceeds a reference unit period (e.g., 1 month), the processor 220 may reset the gradation value.

According to an embodiment, the electronic device 200 may set a gradation value of the first region (121 of FIG. 1A), based on at least one of the electronic device 200 amount of use time and the biometric information acquisition history. The processor 220 may set the gradation value of the first region 121 in the same method as the above-described method of changing the gradation value of the second region 122. For instance, the second region 122 separately provides light to the biometric sensor and thus the second region 122 may have deteriorated more rapidly than the first region 121. Accordingly, the processor 220 may set a compensation variable applied to the first region 121 higher than the compensation variable (a) applied to the second region 122, account for the difference in degradation between the first region 121 and the second region 122. Also, the processor 220 may set the gradation value of the first region 121 higher than the set gradation value of the second region 122. Except for numerical values of the compensation variable and the set gradation value, the first region 121 and the second region 122 may be in progress of degradation in the same method and thus an afterimage may be minimized.

According to an embodiment, the processor 220 may forward an image reflecting a set gradation value to the display driver IC (280 of FIG. 2B), or may forward an image reflecting a gradation value that is directly set by the display driver IC 280, to the display panel (261 of FIG. 2B).

In operation 307, the electronic device 200 may set a luminance of the second region 122, based on the set value of the second region 122. For example, the processor 220 may display an image provided based on the set gradation value of the second region 122, on the display 260 according to the set luminance, and may provide the biometric sensor 241 with light irradiated in the second region 122 according to the set luminance.

According to an embodiment, while an image is displayed on the display 260, in response to a biometric information acquisition event taking place in the second region 122, the electronic device 200 may provide the biometric sensor 241 with only light outputted for an image displayed in the second region 122. However, to increase a biometric information recognition rate, the processor 220 may increase the luminance of the second region 122 during the biometric information acquisition event.

According to an embodiment, the electronic device 200 use time or the biometric information acquisition history may be previously set such that the compensation variable (a) value is varied according to time by using a value previously obtained empirically, etc. For example, the manufacturer may evaluate the actual degradation of the device over time and provide the compensation variable (a) values to the electronic devices 100 wirelessly over the internet.

In operation 309, the electronic device 200 may obtain biometric information by using light outputted from the display 260 based on the set luminance of the second region 122. For example, the processor 220 may obtain the biometric information, based on at least part of light that light outputted in the second region 122 is reflected by an external object (e.g., the body of a user) and then transmits the display 260. For instance, the transmitted light may be received using the biometric sensor 241, and the processor 220 may analyze the received light, to obtain the biometric information (e.g., user fingerprint).

In operation 311, the electronic device 200 may perform user authentication, based on the obtained biometric information. For example, the processor 220 may compare the obtained user's biometric information (e.g., user fingerprint) and previously stored user's reference biometric information (e.g., a reference fingerprint or a previously stored user fingerprint), to identify whether a person who inputs biometric information is consistent with a user of the electronic device 200.

Figure 9A:
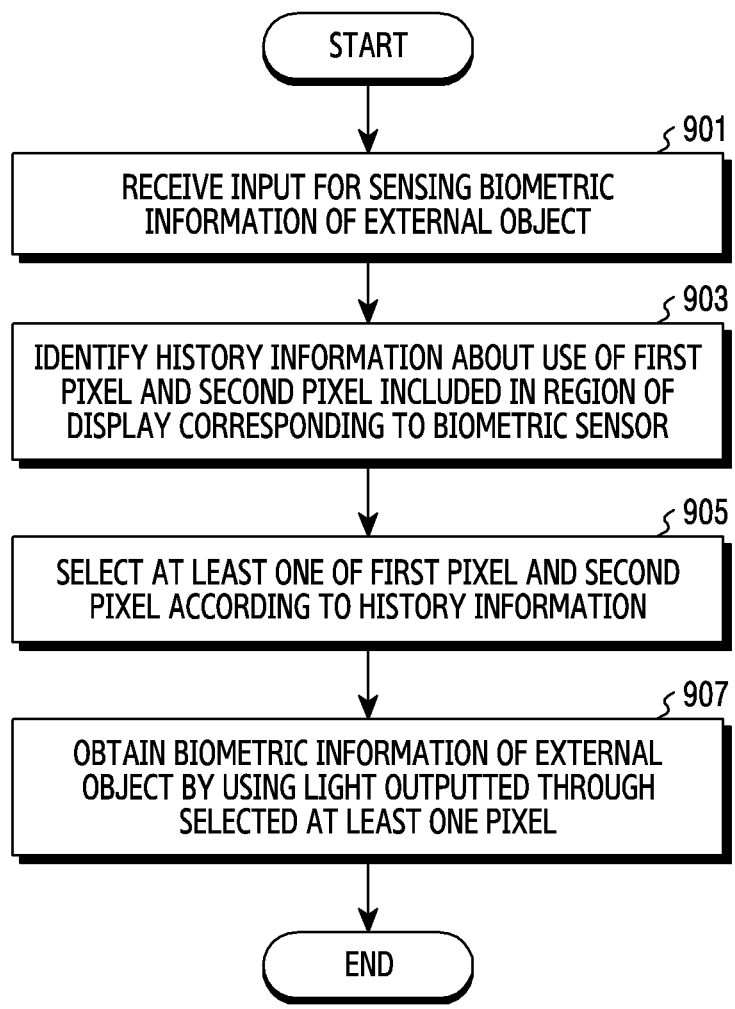
FIG. 9A illustrates a flowchart for obtaining biometric information, based on selected at least one pixel in an electronic device according to various embodiments of the present disclosure.
Figure 9B:
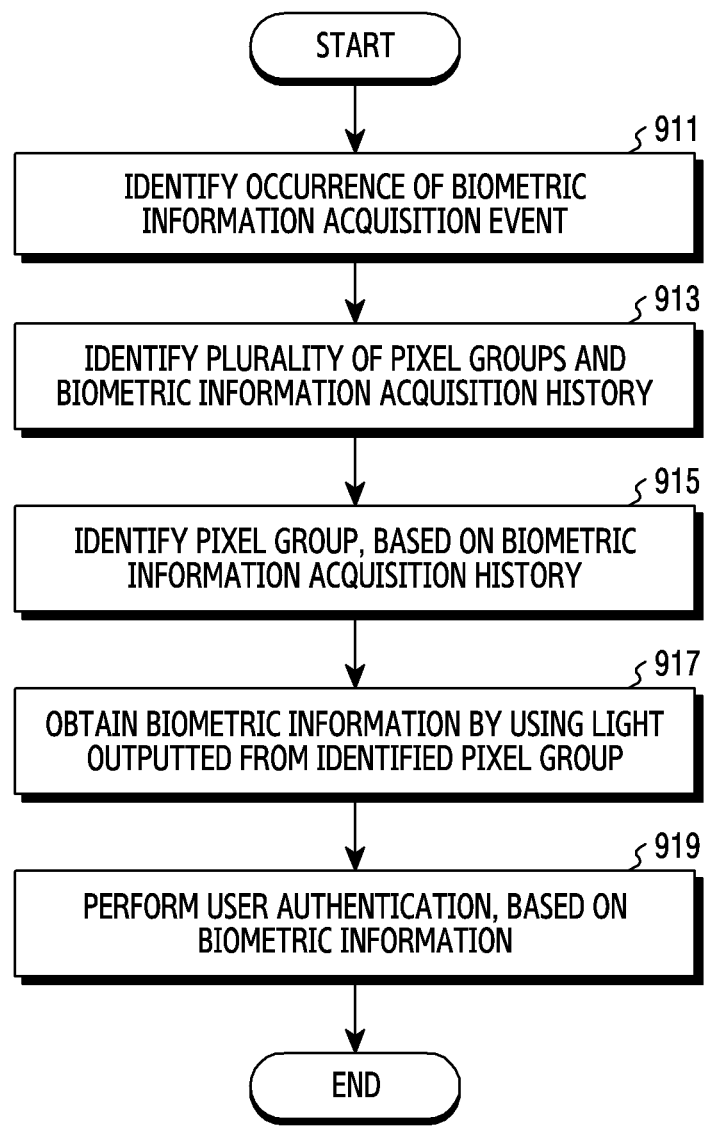
FIG. 9B illustrates a flowchart for obtaining biometric information, based on an identified pixel group in an electronic device according to various embodiments of the present disclosure.

According to an embodiment of the present disclosure, the electronic device 200 may combine and execute the operation of setting a gradation value of the second region 122 disclosed in FIG. 3 and the operation of selecting at least one pixel which will provide light among a plurality of pixels included in the second region disclosed in FIG. 9A and FIG. 9B. That is, the electronic device 200 may select some pixels included in the second region according to the set gradation value, to provide light to the biometric sensor 241.

Figure 4:
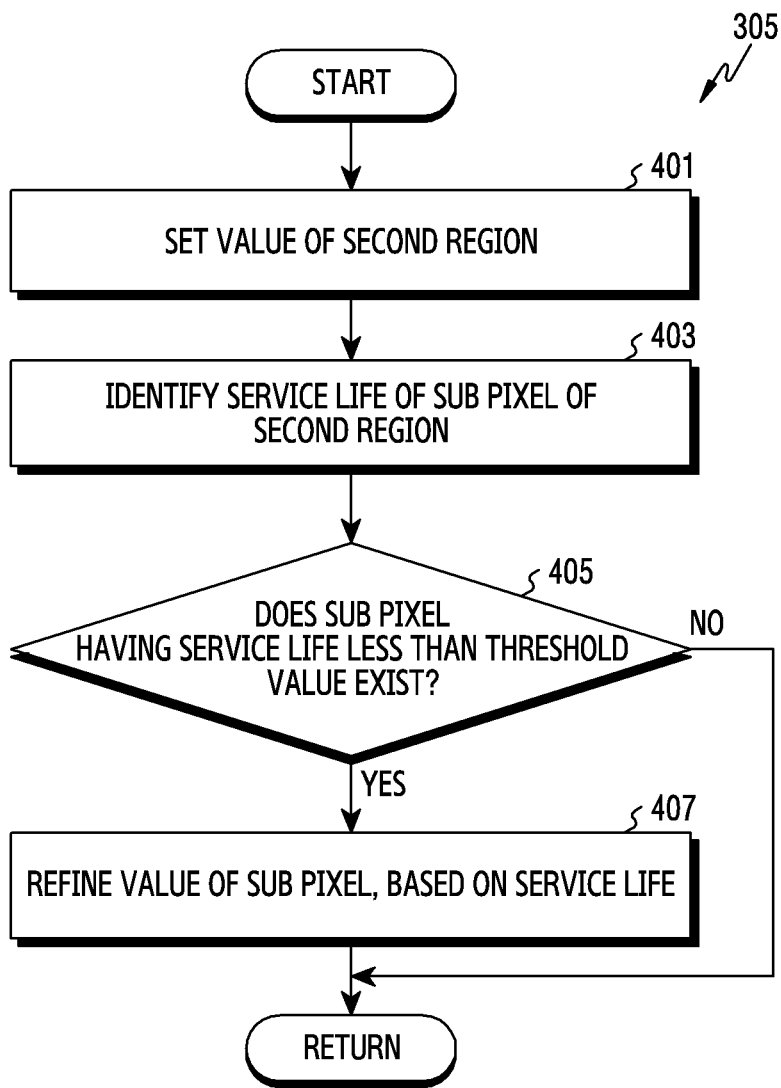
FIG. 4 illustrates a flowchart for refining a gradation value, based on a service life of a sub pixel in an electronic device according to various embodiments of the present disclosure.

FIG. 4 illustrates a flowchart for changing a gradation value for each sub pixel, based on a service life of a sub pixel in an electronic device according to various embodiments of the present disclosure. The following description is made for the operation of changing a gradation value for each sub pixel in operation 305 of FIG. 3. In the following description, the electronic device may include the electronic device 200 of FIG. 2 or at least a part (e.g., the processor 220) of the electronic device 200.

Referring to FIG. 4, in operation 401, the electronic device 200 may set a value of the second region 122. For example, the processor 220 may set a gradation value for each sub pixel of the second region 122, based on at least one of an electronic device 200 use time and a biometric information acquisition history.

In operation 403, the electronic device 200 may identify a service life of the sub pixel of the second region 122. For example, as illustrated in FIG. 1E, the pixel may include a first sub pixel to a third sub pixel, and each sub pixel may have a mutually different service life. For instance, the processor 220 may identify a service life of each sub pixel located in the second region 122. Service life can include the expected remaining life of the sub-pixel. For example, the red, green, and blue sub pixels may have different entire service lives at manufacture.

In operation 405, the electronic device 200 may identify whether a sub pixel having a service life less than a threshold value exists. Herein, the sub pixel having the service life less than the threshold value may mean that a large portion of degradation has proceeded, and the corresponding sub pixel may be difficult to output light having a desired luminance by only a set gradation value. For example, the processor 220 may compare a threshold value and a service life of the sub pixel, to identify the sub pixel having the service life less than the threshold value. Herein, the threshold value may be a value calculated by comparing the remaining service life compared to the entire service life.

In response to the sub pixel having the service life less than the threshold value not existing, the electronic device 200 may return to and perform operation 307 of FIG. 3.

In contrast, in response to the sub pixel having the service life less than the threshold value existing, the electronic device 200 may proceed to operation 407, and change a value of each sub pixel, based on the service life. For example, the processor 220 may increase a gradation value of a color corresponding to the sub pixel having the service life less than the threshold value, than a set value. Thereafter, the electronic device 200 may return to and perform operation 307 of FIG. 3.

According to an embodiment of the disclosure, although not illustrated in the drawings, the electronic device 200 may identify whether a service life difference between sub pixels is greater than a threshold value. As the service life difference between the sub pixels is large, a possibility of providing a difference of luminance between the sub pixels is high. Therefore, the electronic device 200 may change the set gradation value of each sub pixel of the second region 122, based on the service life difference between the sub pixels. For example, in response to the service life difference between the sub pixels being equal to or being greater than the threshold value, the processor 220 may change the set gradation value of each sub pixel such that the gradation value is proportional to the service life between the sub pixels.

Figure 5:
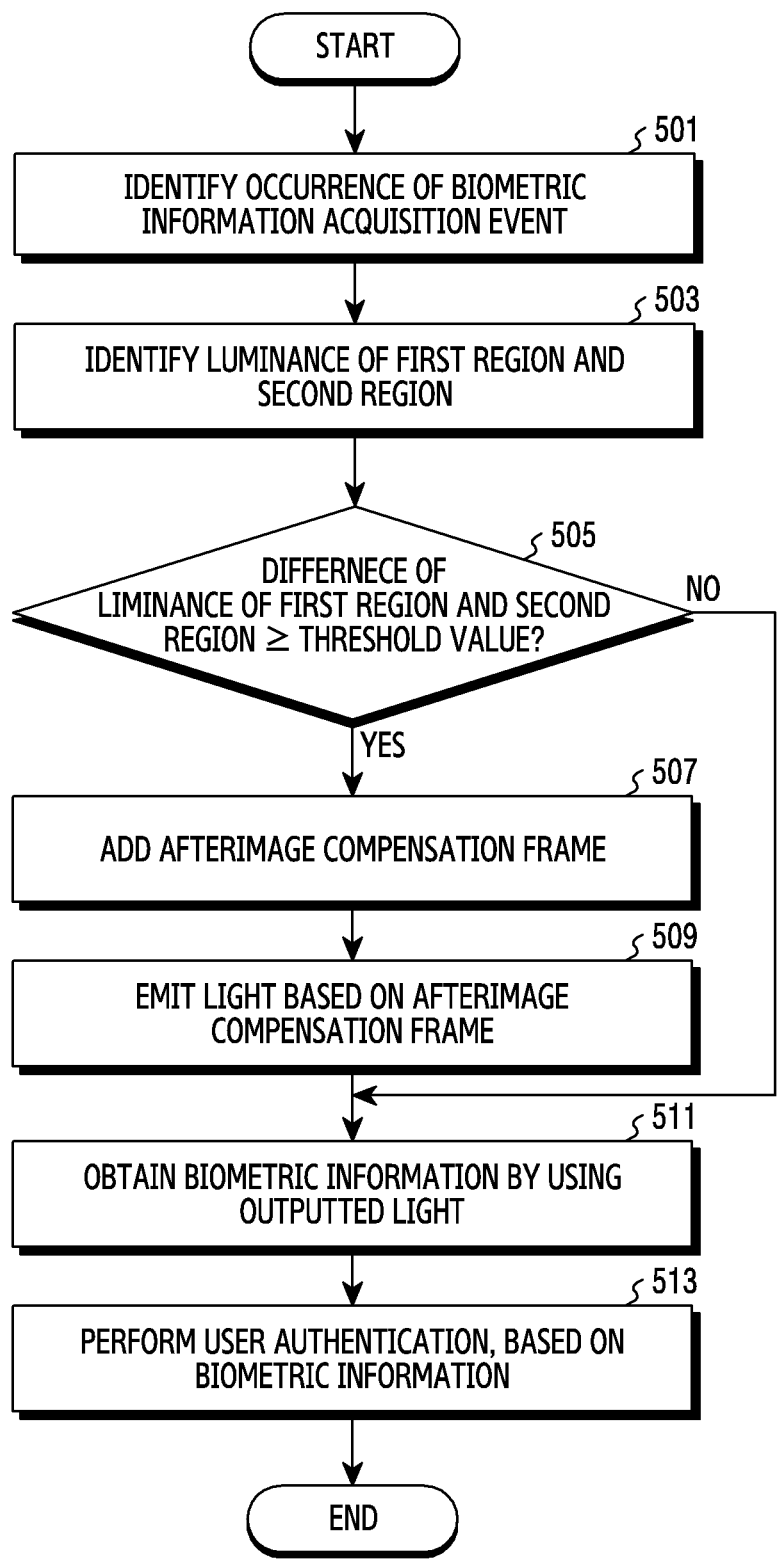
FIG. 5 illustrates a flowchart for obtaining biometric information, based on an afterimage compensation frame in an electronic device according to various embodiments of the present disclosure.
Figure 6A:
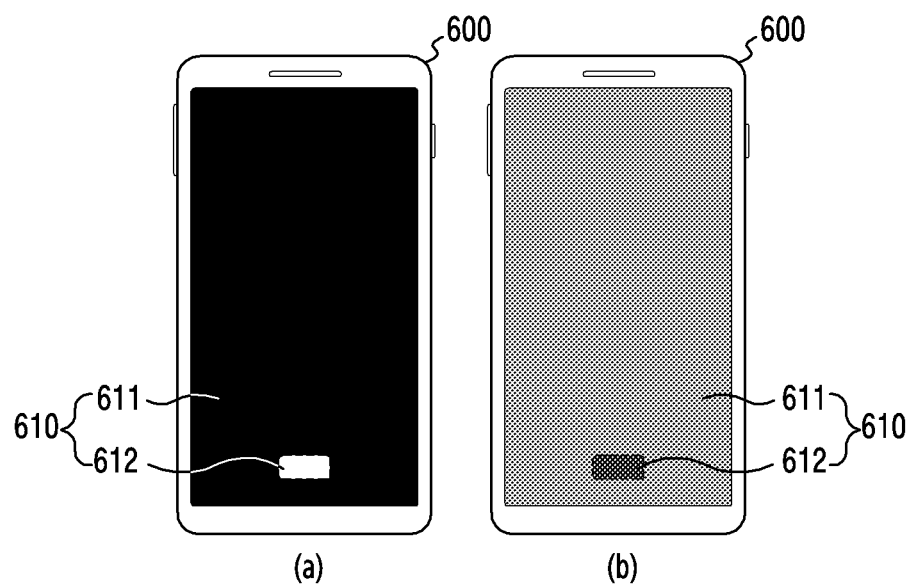
FIG. 6A and FIG. 6B illustrate example diagrams for obtaining biometric information, based on an afterimage compensation frame in an electronic device according to various embodiments of the present disclosure.
Figure 6B:
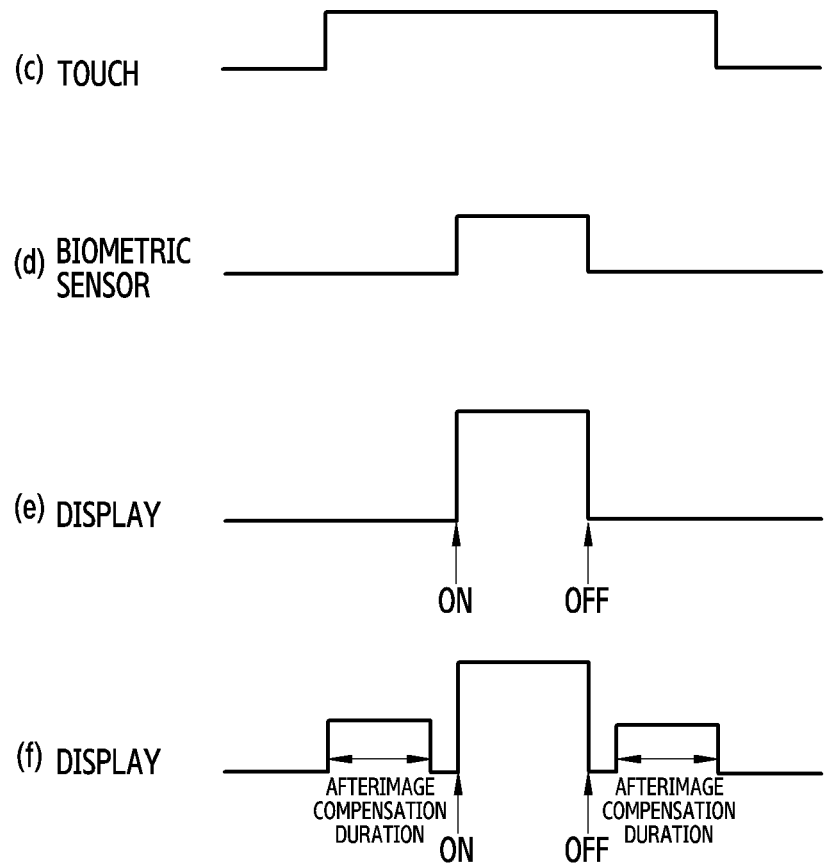

FIG. 5 illustrates a flowchart for obtaining biometric information, based on an afterimage compensation frame in an electronic device according to various embodiments of the present disclosure. FIG. 6A and FIG. 6B illustrate example diagrams for obtaining the biometric information, based on the afterimage compensation frame in the electronic device according to the various embodiments of the present disclosure. In the following description, the electronic device may include the electronic device 200 of FIG. 2 or at least a part (e.g., the processor 220) of the electronic device 200.

Referring to FIG. 5 to FIG. 6B, in operation 501, the electronic device 200 (e.g., the electronic device 100 of FIG. 1A or the electronic device 600 of FIG. 6A) may identify the occurrence of a biometric information acquisition event. For example, the processor 220 may obtain a user's touch input in a second region 612 of a display 610.

According to an embodiment, as a luminance of a light source of the biometric sensor (241 of FIG. 2B) increases, a biometric recognition rate increases and thus, the electronic device 600 may increase the luminance of the second region 612 higher than that of a first region 611. For example, in response to displaying the a continuous picture or video in the first region 611 and second region 612 of the display 610 (e.g., the display 120 of FIG. 1A or the display 260 of FIG. 2A), the processor 220 increase the luminance of the second region 612 more than the luminance of the first region 611 so as to increase the biometric recognition rate. For instance, in response to a user touch input being obtained in the second region 612, the processor 220 may set the luminance of the second region 612 higher than the luminance of the first region 611.

In operation 503, the electronic device 600 may identify the luminance of the first region 611 and second region 612 of the display 610. For example, in response to the electronic device 600 being in a state (a) of FIG. 6A, the processor 220 may measure light outputted from the first region 611 and light outputted from the second region 612, to identify the luminance of the first region 611 and second region 612. Herein, the state (a) may be a case of increasing the luminance of the second region 612 so as to increase a fingerprint recognition rate.

In operation 505, the electronic device 600 may identify whether a difference of the luminance of the first region 611 and second region 612 is equal to or is greater than a threshold value. For example, in response to providing light in the second region 612 so as to obtain biometric information, the processor 220 may identify whether the difference of the luminance of the first region 611 and second region 612 is equal to or is greater than the threshold value. Herein, the threshold value may be a value that may be known to equalize degradation between the first region 611 and the second region 612, because degradation speeds of the first region 611 and second region 612 are different from each other.

In response to the difference of the luminance of the first region 611 and second region 612 being less than the threshold value, the electronic device 600 may jump to operation 511 and obtain biometric information by using emitted light and then, may proceed to operation 513 and perform user authentication, based on the biometric information.

In contrast, in response to the difference of the luminance of the first region 611 and second region 612 being equal to or being greater than the threshold value, the electronic device 600 may proceed to operation 507 and add an afterimage compensation frame. For example, as in FIG. 6B, a user's touch input may be sensed (c), and light may be provided (e) to a biometric sensor in the second region 612 of the display 610, and the biometric sensor may sense (d) user's biometric information. In this case, the processor 220 may perform the driving of the display 260 as in (f), not (e). For instance, the processor 220 may add (f) afterimage compensation frames all of before a corresponding frame providing light in the second region 612, after the corresponding frame, or before and after the corresponding frame. Herein, the afterimage compensation frame may be a frame capable of emitting light from the first region 611 before and after biometric sensor driving by reflecting a color and luminance of light outputted in the second region 612. For instance, as adding the afterimage compensation frame, the processor 220 may emit light from the first region 611 before and after biometric sensor sensing, and may maintain identical a luminance and color of the first region 611 and second region 612 before and after the biometric sensor sensing. Herein, because two afterimage compensation frames may be added before and after the biometric sensor sensing, the luminance of the afterimage compensation frame may be ½ of the luminance of the second region 612. As an example, the processor 220 may add a dimming effect of gradually getting dark or bright such that frame conversion may be naturally performed according to the adding of the afterimage compensation frame. Also, a manual calibration mode may be applied in a scheme in which the afterimage compensation frame is converted.

In operation 509, the electronic device 600 may emit light from the display 610, based on the afterimage compensation frame. For example, after sensing a user's touch input, the processor 220 may emit light from the display 610, based on the afterimage compensation frame and, after providing light to the biometric sensor in the second region 612, the processor 220 may again emit light from the display 610, based on the afterimage compensation frame.

In operation 511 and operation 513, the electronic device 600 may obtain biometric information by using the outputted light, and may perform user authentication, based on the biometric information. Operation 511 and operation 513 are substantially identical with operation 309 and operation 311 of FIG. 3 and therefore, a detailed description thereof is omitted.

Figure 7:
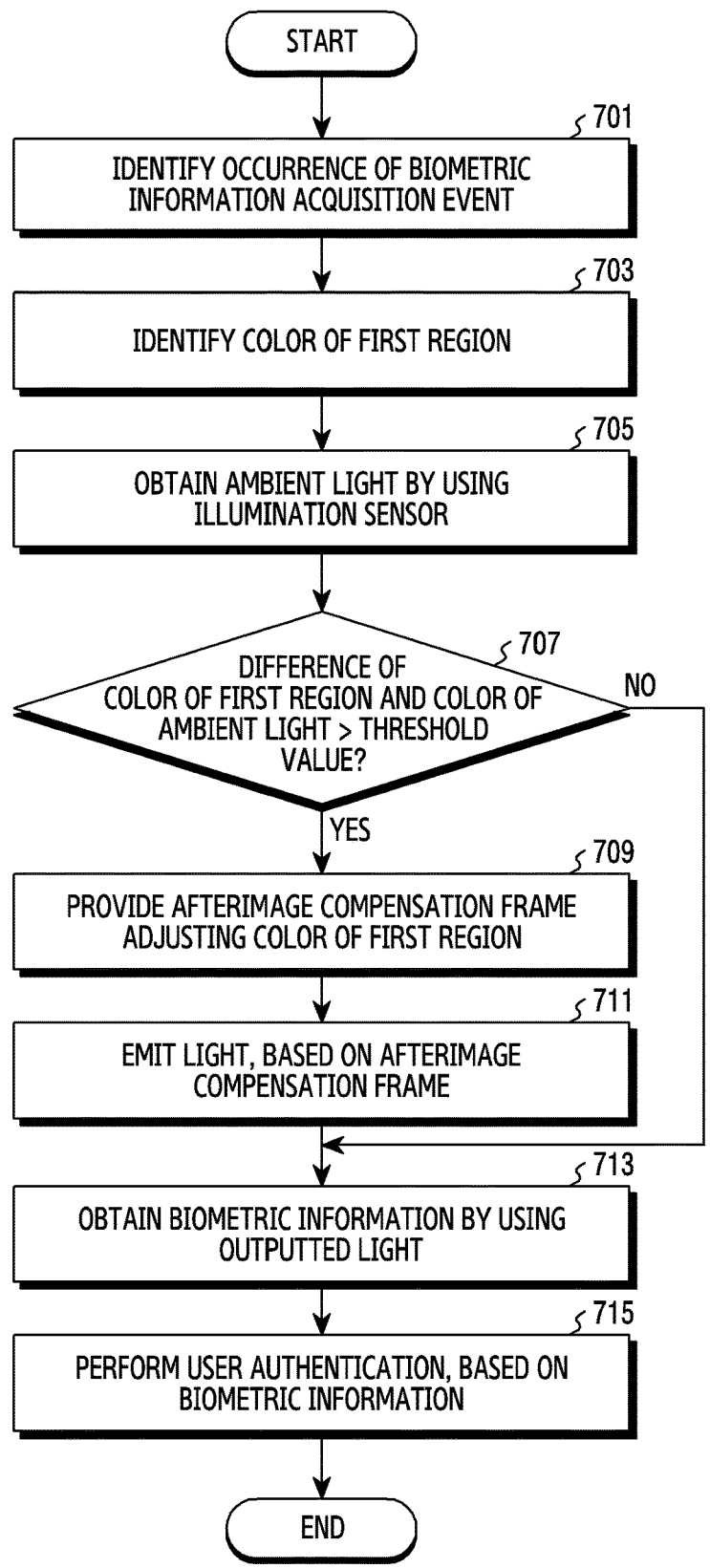
FIG. 7 illustrates a flowchart for obtaining biometric information, based on an afterimage compensation frame reflecting ambient light in an electronic device according to various embodiments of the present disclosure.
Figure 8A:
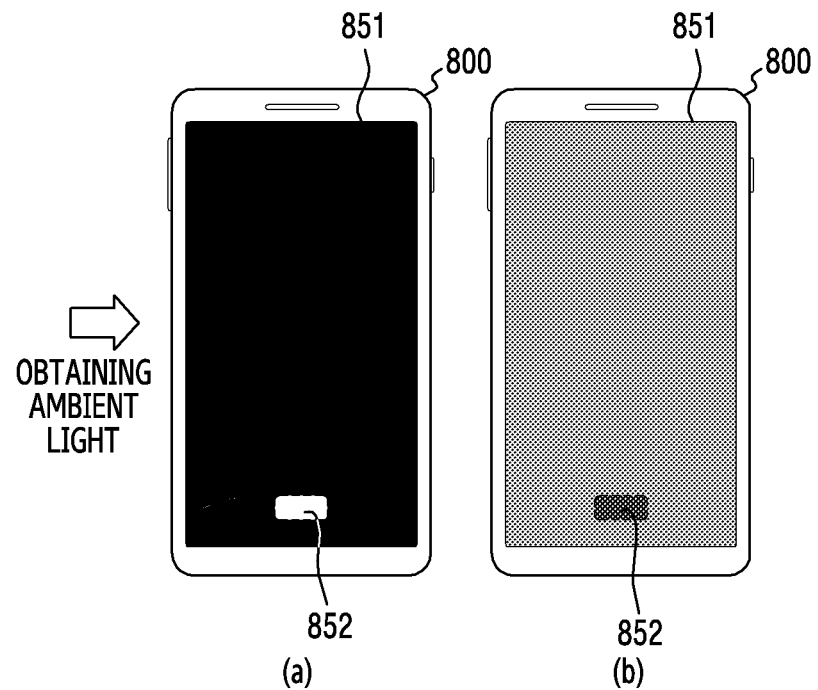
FIG. 8A and FIG. 8B illustrate example diagrams for obtaining biometric information, based on an afterimage compensation frame reflecting ambient light in an electronic device according to various embodiments of the present disclosure.
Figure 8B:
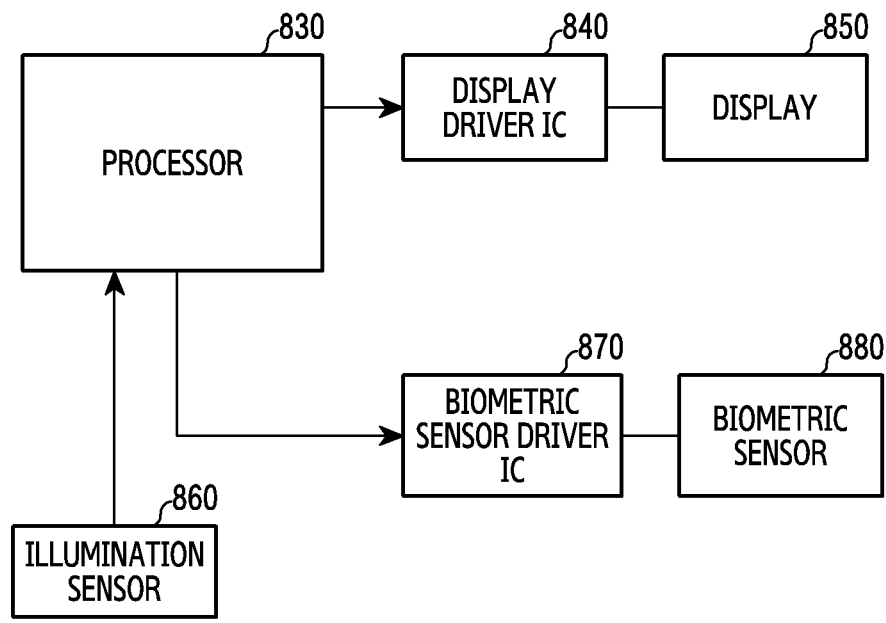

FIG. 7 illustrates a flowchart for obtaining biometric information, based on an afterimage compensation frame reflecting ambient light in an electronic device according to various embodiments of the present disclosure. FIG. 8A and FIG. 8B illustrate example diagrams for obtaining the biometric information, based on the afterimage compensation frame reflecting the ambient light in the electronic device according to various embodiments of the present disclosure. In the following description, the electronic device may include the electronic device 200 of FIG. 2 or at least a part (e.g., the processor 220) of the electronic device 200.

Referring to FIG. 7 to FIG. 8B, in operation 701, the electronic device 200 (e.g., the electronic device 100 of FIG. 1A, the electronic device 600 of FIG. 6A or the electronic device 800 of FIG. 8A) may identify the occurrence of a biometric information acquisition event. For example, the processor 830 may obtain a user's touch input in a second region 852 of a display 850.

In operation 703, the electronic device 800 may identify a luminance of a first region 851 of the display 850. For example, the processor 830 may identify the luminance of the first region 851 of the display 850 (e.g., the display 120 of FIG. 1A, the display 260 of FIG. 2A, or the display 610 of FIG. 6A) through a display driver IC 840.

In operation 705, the electronic device 800 may obtain ambient light by using an illumination sensor 860. For example, while obtaining a user's touch input, the processor 830 may obtain a color, luminance, etc. of the ambient light by using the illumination sensor 860.

In operation 707, the electronic device 800 may identify whether a difference of a color of the first region 851 and a color of the ambient light exceeds a threshold value. Herein, the threshold value may be a boundary value before the first region 851 is conspicuously recognized by a user due to the difference of the colors of the first region 851 and the ambient light. For example, by comparing the obtained color of the ambient light and the color of the first region 851 with each other, the processor 830 may identify whether the color difference exceeds the threshold value.

In response to the difference of the color of the first region 851 and the color of the ambient light not exceeding the threshold value, the electronic device 800 may jump to operation 713 and obtain biometric information through a biometric (e.g., fingerprint) sensor 880 by using outputted light. Thereafter, the electronic device 800 may proceed to operation 715 and perform user authentication, based on the biometric information, through a biometric (e.g., fingerprint) sensor driver IC 870.

In contrast, in response to the difference of the color of the first region 851 and the color of the ambient light exceeding the threshold value, the electronic device 800 may proceed to operation 709 and provide an afterimage compensation frame adjusting the color of the first region 851. In response to the colors of the ambient light and the first region 851 being different from each other, because the first region 851 is conspicuous, the user may be subjected to hindrance of user authentication carried out in the second region 852. Accordingly, the processor 830 may provide an afterimage compensation frame such that the color of the ambient light and the color of the first region 851 are consistent with each other. Herein, the afterimage compensation frame may include the first region 851 reflecting the color of the ambient light.

In operation 711, the electronic device 800 may emit light, based on the afterimage compensation frame. For example, the processor 830 may forward the afterimage compensation frame provided from the display driver IC 840, and the display driver IC 840 may drive the display 850, based on the afterimage compensation frame. Accordingly, in response to the biometric information acquisition event taking place, the processor 220 may change the display 850 into a state (b) of FIG. 8A, not a state (a) of FIG. 8A.

In operation 713, the electronic device 800 may obtain biometric information through the biometric (e.g., fingerprint) sensor 880 by using the outputted light. In operation 715, the electronic device 800 may perform user authentication, based on the biometric information, through the biometric (e.g., fingerprint) sensor driver IC 870. Operation 713 and operation 715 are substantially the same as operation 309 and operation 311 of FIG. 3 and therefore, a detailed description thereof is omitted.

It is noted that the number of pixels in a region may far exceed the number needed to authenticate or verify, for example, a fingerprint, or other biometric for identification. Accordingly, to increase the life of the electronic device, only selected pixels can be used.

FIG. 9A illustrates a flowchart for obtaining biometric information, based on selected at least one pixel in an electronic device according to various embodiments of the present disclosure. In the following description, the electronic device may include the electronic device 200 of FIG. 2 or at least a part (e.g., the processor 220) of the electronic device 200. Generally, where pixels in the second region 122 that have been used the least amount of times are selected to irradiate light for biometric information.

Referring to FIG. 9A, in operation 901, the electronic device 200 (e.g., the electronic device 100 of FIG. 1A, the electronic device 600 of FIG. 6A, or the electronic device 800 of FIG. 8A) may receive an input for sensing biometric information (e.g., a fingerprint) of an external object (e.g., a user's finger). For example, the processor 220 may obtain a user's touch input in the second region (122 of FIG. 1A) of the display (260 of FIG. 2A).

In operation 903, the electronic device 200 may identify history information about use of a first pixel and a second pixel included in a region (e.g., the second region 122) of a display corresponding to the biometric sensor (241 of FIG. 2B). Herein, the history information about the use of the first pixel and the second pixel may include the number of times of providing, by the first pixel and the second pixel, light to the biometric sensor 241 so as to obtain biometric information.

In operation 905, the electronic device 200 may select at least one pixel among the first pixel and the second pixel according to the history information. For example, the processor 220 may compare the number of times of providing, by the first pixel, light to the biometric sensor 241 and the number of times of providing, by the second pixel, light to the biometric sensor 241. As the comparison result, the processor 220 may select the pixel in which the number of times of providing light to the biometric sensor 241 is less.

In operation 907, the electronic device 200 may obtain biometric information of an external object through the biometric sensor 241 by using the light outputted through the selected at least one pixel. For example, the processor 220 may receive, through the biometric sensor 241, at least part of light that the outputted light is reflected by the external object and then transmits the display 260, and may analyze the received light, to obtain the biometric information.

According to an embodiment of the disclosure, the electronic device 200 may select, by the unit of sub pixel, a light source which will provide light to the biometric sensor 241. For instance, the processor 220 may identify the properties of a plurality of sub pixels included in a display region (e.g., the second region 122) corresponding to the biometric sensor 241, and may select at least one sub pixel among the plurality of sub pixels, based on the identified properties of the plurality of sub pixels. The selected sub pixel may provide light to the biometric sensor 241. Herein, the properties of the plurality of sub pixels may include at least one of a color of light outputted from the sub pixel, a service life of the sub pixel, or a use time of the sub pixel. Undoubtedly, unlike this, the processor 220 may select at least one sub pixel among the plurality of sub pixels, based on a biometric information acquisition history.

According to an embodiment of the disclosure, the electronic device 200 may combine and execute the operation of setting a gradation value of the second region 122 disclosed in FIG. 3 and the operation of selecting at least one pixel which will provide light among a plurality of pixels included in the second region 122 disclosed in FIG. 9A and FIG. 9B. That is, the electronic device 200 may select some pixels or some sub pixels included in the second region according to a set gradation value, to provide light to the biometric sensor 241. For example, the processor 220 may set a value of a region (e.g., the second region 122) of a display corresponding to the biometric sensor 241, based on the identified properties of the plurality of sub pixels, and may set a luminance of the display region corresponding to the biometric sensor 241, based on the set value of the display region corresponding to the biometric sensor 241, and may emit light from the selected at least one sub pixel, based on the set luminance.

According to an embodiment of the disclosure, while performing the operation of selecting at least one sub pixel which will provide light to the biometric sensor 241, the electronic device 200 may, apart from this, refine even a gradation value of a sub pixel included in a display region corresponding to the biometric sensor 241. For example, independently from the operation of selecting at least one sub pixel, the processor 220 may perform the operation of identifying a service life of a sub pixel included in a display region corresponding to the biometric sensor 241, the operation of identifying whether a sub pixel having a service life less than a threshold value exists, and the operation of, in response to the sub pixel having the service life less than the threshold value existing, refining a gradation value of the sub pixel, based on the identified service life.

FIG. 9B illustrates a flowchart for obtaining biometric information, based on an identified pixel group in an electronic device according to various embodiments of the present disclosure. FIG. 10A to FIG. 12 illustrate example diagrams for obtaining the biometric information, based on the identified pixel group in the electronic device according to various embodiments of the present disclosure. In the following description, the electronic device may include the electronic device 200 of FIG. 2 or at least a part (e.g., the processor 220) of the electronic device 200.

Referring to FIG. 9B to FIG. 11, in operation 911, the electronic device 200 (e.g., the electronic device 100 of FIG. 1A, the electronic device 600 of FIG. 6A, or the electronic device 800 of FIG. 8A) may identify the occurrence of a biometric information acquisition event. For example, the processor 220 may obtain a user's touch input in the second region (122 of FIG. 1A) of a display 1010.

In operation 913, the electronic device 200 may identify a plurality of pixel groups and a biometric information acquisition history. For example, the processor 220 may divide the second region 122 of the display 1010 (e.g., the display 120 of FIG. 1A, the display 260 of FIG. 2A, or the display 610 of FIG. 6A) overlapping with a biometric sensor 1020, into a plurality of regions. For instance, as in FIG. 10A, the processor 220 may divide the second region 122 into a first pixel group 1011, a second pixel group 1012, a third pixel group 1013, and a fourth pixel group 1014, and may identify the plurality of pixel groups. Also, the processor 220 may identify the number of times of accumulated acquisition of user's biometric information obtained in the second region 122.

According to an embodiment, unlike illustrated in the drawing, the biometric sensor 1020 may be implemented in a capacitive overlay scheme by forming a sensing electrode on the display 1010 (e.g., forming on a separate layer on the display 1010, or directly forming on an upper surface of the display 1010, or the like).

According to an embodiment, the biometric sensor 1020 for obtaining biometric information may be disposed at a lower end of a partial region (e.g., the second region 122 of FIG. 1A) of the display 1010. For instance, the biometric sensor 1020 may be separately disposed on a circuit substrate mounted beneath the display 1010 or may be attached to a lower end of the display 1010.

Figure 10A:
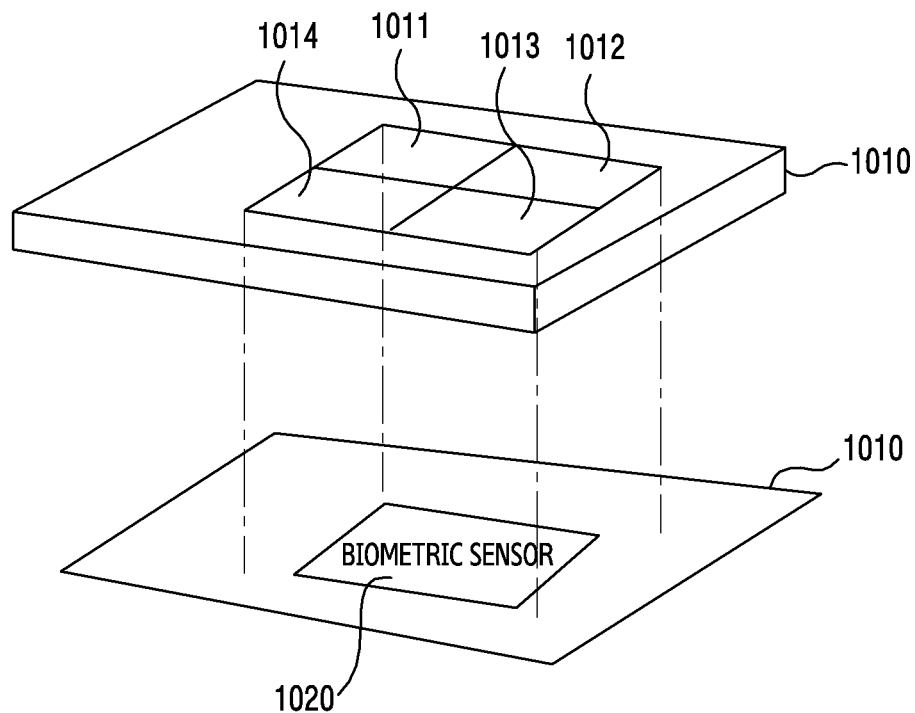
FIG. 10A, FIG. 10B, FIG. 11 and FIG. 12 illustrate example diagrams for obtaining biometric information, based on an identified pixel group in an electronic device according to various embodiments of the present disclosure.
Figure 10B:
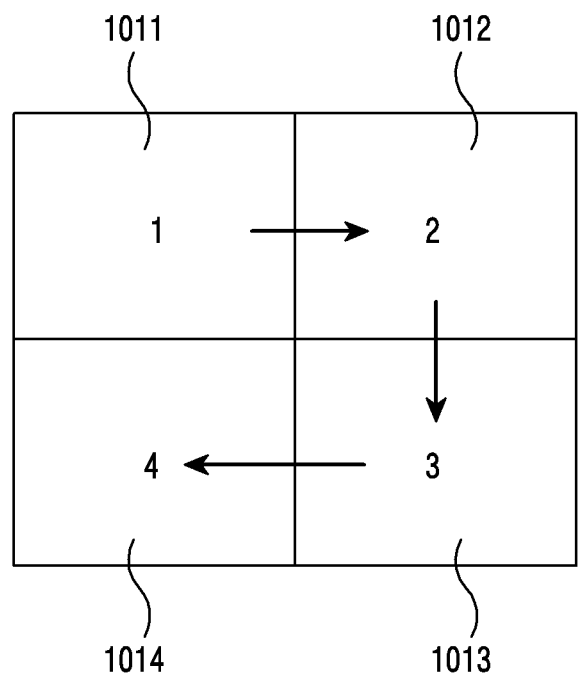

In operation 915, the electronic device 200 may identify a pixel group, based on a biometric information (e.g., fingerprint) acquisition history. For example, the processor 220 may identify a pixel group in which the number of times of light emission is least, based on a fingerprint acquisition history, and may emit light from the identified pixel group, to provide light to the biometric sensor 1020. Also, according to an embodiment, as illustrated in FIG. 10B, the first pixel group 1011, the second pixel group 1012, the third pixel group 1013, and the fourth pixel group 1014 may be sequentially driven, and the processor 220 may identify a pixel group corresponding to a sequence which will drive in response to sensing a user touch input, as a pixel group which will provide light to the biometric sensor 1020.

According to an embodiment, the biometric information acquisition history may include at least one of a biometric (e.g., finger) input (e.g., touch) time, a biometric input point, a biometric input sequence, a history of a pixel group in which biometric information is obtained, and/or the number of times of light emission of the pixel group.

Figure 11:
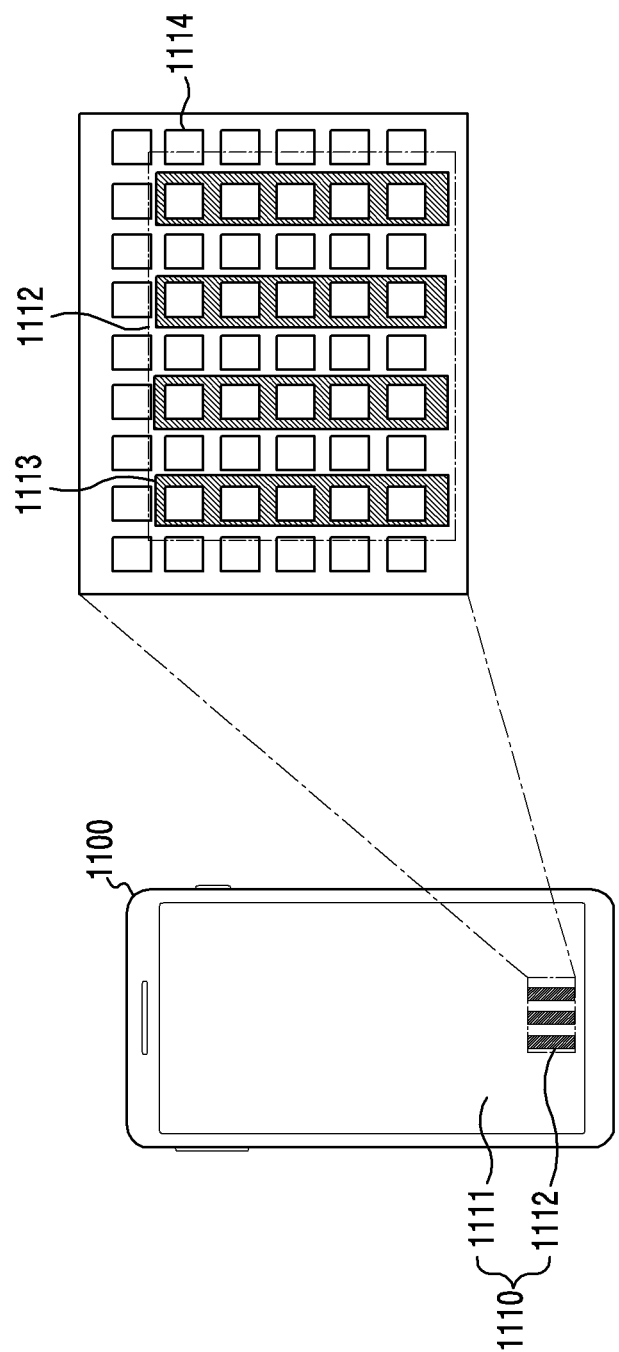

According to an embodiment, as illustrated in FIG. 11, an electronic device 1100 (e.g., the electronic device 100 of FIG. 1A, the electronic device 200 of FIG. 2A, the electronic device 600 of FIG. 6A, or the electronic device 800 of FIG. 8A) may divide a second region 1112 of a display 1110 (e.g., the display 120 of FIG. 1A, the display 260 of FIG. 2A, the display 610 of FIG. 6A, or the display 810 of FIG. 8A) into a plurality of pixel groups. For example, the processor 220 may divide pixels disposed in an even-numbered column among a plurality of pixels disposed in the second region 1112, as a first pixel group 1113, and may divide pixels disposed in an odd-numbered column, as a second pixel group 1114. Accordingly, the processor 220 may identify the first pixel group 1113 and the second pixel group 114, and may identify the first pixel group 1113 or the second pixel group 1114, as a pixel group which will provide light to the biometric sensor 1020, based on a fingerprint acquisition history. For instance, the processor 220 may emit light from the first pixel group 1113 and the second pixel group 1114 alternately whenever the biometric information acquisition event takes place.

According to an embodiment, the pixel group illustrated in FIG. 11 is an example and, besides this, the pixel group may be classified in various forms such as a check pattern, a stripe pattern, a grid pattern or the like.

In operation 917, the processor 200 may obtain biometric information by using light outputted from the identified pixel group. For example, as illustrated in FIG. 10B, the processor 220 may obtain the biometric information through the biometric sensor 1020 by using the light outputted from the second pixel group 1012. As above, as dividing and driving the second region 1020, the processor 220 may retard the degradation of the second region 1020.

In operation 919, the electronic device 200 may perform user authentication, based on the biometric information. For example, the processor 220 may compare the obtained user's biometric information and previously stored user's reference biometric information, to identify whether a person who inputs the biometric information is consistent with a user of the electronic device 200.

Figure 12:
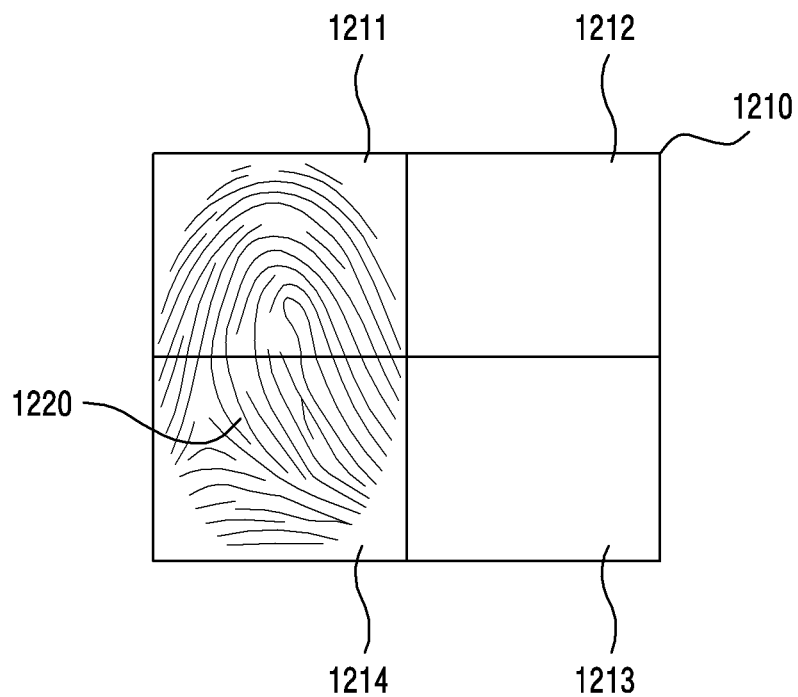

According to an embodiment of the disclosure, as illustrated in FIG. 12, the electronic device 200 may identify whether user's biometric information (e.g., a fingerprint 1220) is obtained more than a reference recursion in which pixel group among a plurality of pixel groups 1211 to 1214 of the second region 1210. For example, the processor 220 may identify that the biometric information 1220 is obtained more than a reference recursion in the first pixel group 1211 and the fourth pixel group 1214. Accordingly, to retard the degradation of the first pixel group 1211 and the fourth pixel group 1214, the processor 220 may identify the second pixel group 1212 and the third pixel group 1213 as pixel groups which will provide light to the biometric sensor. In this case, in response to identifying the occurrence of a biometric information acquisition event, the processor 220 may display a guide message on the display 1010 such that the user's body gets in contact with the second pixel group 1212 and the third pixel group 1213.

According to an embodiment of the disclosure, the electronic device 200 may identify a sub pixel which will provide light to the biometric sensor, based on a service life of the sub pixel. For example, in response to the service life of the sub pixel being equal to or being less than a threshold value, the processor 220 may provide light to the biometric sensor by using the remaining sub pixel excepting the corresponding sub pixel. For instance, in response to a service life of a sub pixel emitting light in blue being equal to or being less than the threshold value, the processor 220 may provide light to the biometric sensor 1020 by using only a sub pixel that emits light in red and a sub pixel that emits light in green.

Figure 13:
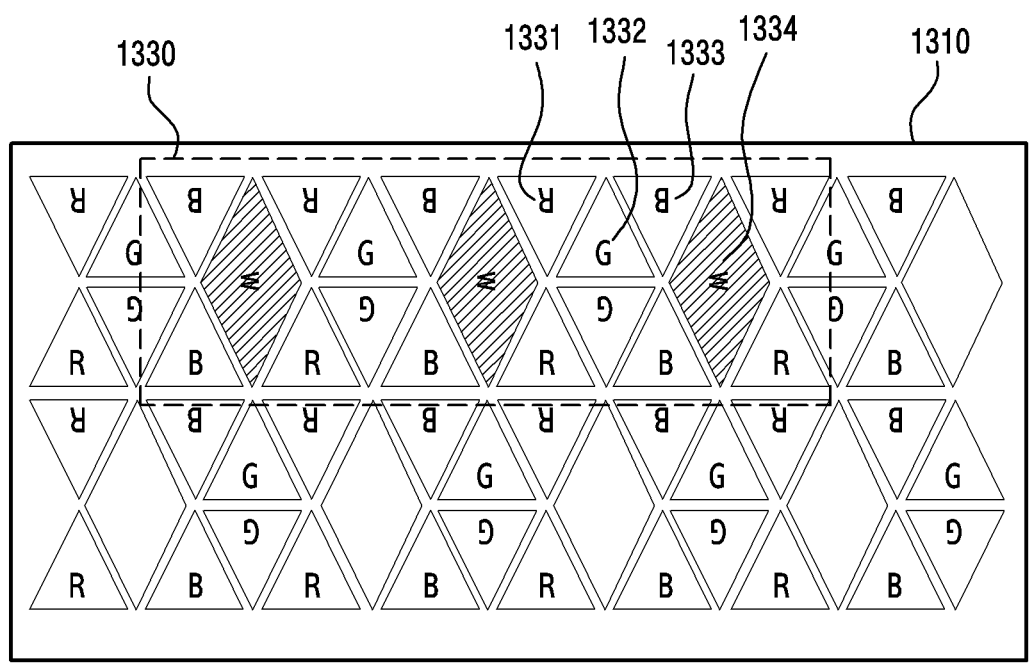
FIG. 13 illustrates an example diagram for obtaining biometric information, based on a fingerprint sensor exclusive pixel in an electronic device according to various embodiments of the present disclosure.

FIG. 13 illustrates an example diagram for obtaining biometric information, based on a fingerprint sensor exclusive pixel in an electronic device according to various embodiments of the present disclosure. In the following description, the electronic device may include the electronic device 200 of FIG. 2 or at least a part (e.g., the processor 220) of the electronic device 200.

Referring to FIG. 13, the electronic device 200 may include a biometric sensor light providing exclusive pixel 1334 (or white light) in a second region 1330 of a display 1310 (e.g., the display 120 of FIG. 1A, the display 260 of FIG. 2A, the display 610 of FIG. 6A, the display 810 of FIG. 8A, or the display 1110 of FIG. 11). For example, the display 1310 may include the biometric sensor light providing exclusive pixel 1334 in the second region 1330, aside from a first sub pixel 1331, a second sub pixel 1332 and a third sub pixel 1333. For instance, in response to the biometric information acquisition event taking place, the processor 220 may provide light to a biometric sensor by using the biometric sensor light providing exclusive pixel 1334.

According to an embodiment of the disclosure, unlike illustrated in FIG. 13, the electronic device 200 may include the biometric sensor light providing exclusive pixel 1334 in a first region 1320 of the display 1310. For instance, the processor 220 may activate the biometric senor light providing exclusive pixel 1334 disposed in the second region 1330, and may inactivate the biometric sensor light providing exclusive pixel 1334 disposed in the first region 1320. As an example, in response to a location of the second region 1330 being changed, the processor 220 may activate the biometric sensor light providing exclusive pixel 1334 of the changed second region 1330, and may inactivate the biometric sensor light providing exclusive pixel 1334 of the original second region 1330.

According to an embodiment of the disclosure, the electronic device 200 may shift the second region 1330 in order to slow the degradation of the second region 1330. For example, the electronic device 200 may have the biometric sensor such that the biometric sensor corresponds to the entire region of the display 1310. The processor 220 may set another region of the display 1310 as the second region 1330, without using the second region 1330 having ever provided light when obtaining previous biometric information. In this case, the processor 220 may display an icon of guiding a location of the second region 1330 through the display 1310.

According to various embodiments of the present disclosure, a method for operating in an electronic device may include the operations of receiving an input for sensing biometric information of an external object, and in response to the input, selecting at least one pixel among a first pixel and a second pixel in accordance with history information about use of the first pixel and second pixel included in a region of a display corresponding to a biometric sensor among a plurality of pixels, and obtaining the biometric information of the external object through the biometric sensor by using light outputted through the selected at least one pixel.

According to various embodiments, the method may further include the operations of identifying the properties of a plurality of sub pixels which are included in the region of the display corresponding to the biometric sensor, and selecting at least one sub pixel among the plurality of sub pixels, based on the identified properties of the plurality of sub pixels.

According to various embodiments, the properties of the plurality of sub pixels may include at least one of a color of light outputted from the sub pixel, a service life of the sub pixel, or a time of use of the sub pixel.

According to various embodiments, the method may include the operations of setting a value of the region of the display corresponding to the biometric sensor, based on the identified properties of the plurality of sub pixels, and setting a luminance of the display region corresponding to the biometric sensor, based on the set value of the display region corresponding to the biometric sensor, and emitting light from the selected at least one sub pixel, based on the set luminance.

According to various embodiments, the method may include the operations of identifying a service life of a sub pixel included in the display region corresponding to the biometric sensor, and identifying whether a sub pixel having a service life less than a threshold value exists, and in response to the sub pixel having the service life less than the threshold value existing, refining a gradation value of the sub pixel, based on the identified service life.

According to various embodiments, the method may further include the operation of obtaining the biometric information, based on at least part of light that the outputted light is reflected from the external object and then transmits the display.

According to various embodiments of the present disclosure, a method for operating in an electronic device may include the operations of identifying the occurrence of a biometric information acquisition event, and identifying at least one of an electronic device use time or a biometric information acquisition history, and setting a value of a second region of a display of the electronic device, based on at least one of the electronic device use time or the biometric information acquisition history, and setting a luminance of the second region, based on the set value of the second region, and obtaining biometric information through a biometric sensor of the electronic device by using light outputted from the display, based on the set luminance of the second region.

According to various embodiments, the display may include a first region and a second region, and the biometric sensor may be disposed in at least one of the first region or the second region, and the method may further include the operation of activating the biometric sensor disposed in the second region.

According to various embodiments, the operation of setting the gradation value of the second region may include the operations of identifying a service life of a sub pixel disposed in the second region, and identifying whether a sub pixel having a service life less than a threshold value exists, and in response to the sub pixel having the service life less than the threshold value existing, refining a gradation value of the sub pixel, based on the identified service life.

According to various embodiments, the method may further include the operations of identifying a luminance of the first region and second region, and identifying whether a difference of the luminance of the first region and second region is equal to or is greater than a threshold value, and in response to the difference of the luminance of the first region and second region being equal to or being greater than the threshold value, adding an afterimage compensation frame, and emitting light from the display, based on the added afterimage compensation frame.

According to various embodiments, the method may further include the operations of obtaining ambient light around an electronic device by using an illumination sensor of the electronic device, and identifying whether a difference of a color of the ambient light and a color of the first region exceeds a threshold value, and in response to the difference of the color of the ambient light and the color of the first region exceeding the threshold value, providing an afterimage compensation frame adjusting the color of the first region, and emitting light from the display, based on the provided afterimage compensation frame.

According to various embodiments, the operation of identifying the occurrence of a biometric information acquisition event may include the operation of receiving an input for sensing biometric information of an external object.

According to various embodiments, the method may further include the operations of obtaining the biometric information, based on at least part of light that the outputted light is reflected from the external object and then transmits the display.

According to various embodiments, the biometric information acquisition history may include at least one of a biometric input time, a biometric input point, a biometric input sequence, a history of a pixel group in which biometric information is obtained among the plurality of pixel groups, or the number of times of light emission of the pixel group included in the plurality of pixel groups.

According to various embodiments of the present disclosure, a method for operating in an electronic device may include the operations of identifying the occurrence of a biometric information acquisition event, and identifying a plurality of pixel groups disposed in a second region of a display of the electronic device and a biometric information acquisition history, and identifying at least one pixel group among the plurality of pixel groups, based on the biometric information acquisition history, and obtaining biometric information through the biometric sensor of the electronic device by using light outputted from the identified pixel group.

According to various embodiments, the display may include a first region and a second region, and the biometric sensor may be disposed in at least one of the first region or the second region, and the method may further include the operation of activating the biometric sensor disposed in the second region.

According to various embodiments, the biometric information acquisition history may include at least one of a biometric input time, a biometric input point, a biometric input sequence, a history of a pixel group in which biometric information is obtained among the plurality of pixel groups, or the number of times of light emission of the pixel group included in the plurality of pixel groups.

According to various embodiments, the method may further include identifying the properties of a plurality of sub pixels which are included in the second region of the display, and selecting at least one sub pixel among the plurality of sub pixels, based on the identified properties of the plurality of sub pixels.

According to various embodiments, the properties of the plurality of sub pixels may include at least one of a color of light outputted from the sub pixel, a service life of the sub pixel, or a time of use of the sub pixel.

According to various embodiments, the method may further include identifying that a biometric information acquisition event occurs as receiving an input for sensing biometric information of an external object, and obtaining the biometric information, based on at least part of light that the outputted light is reflected from the external object and then transmits the display.

Figure 14:
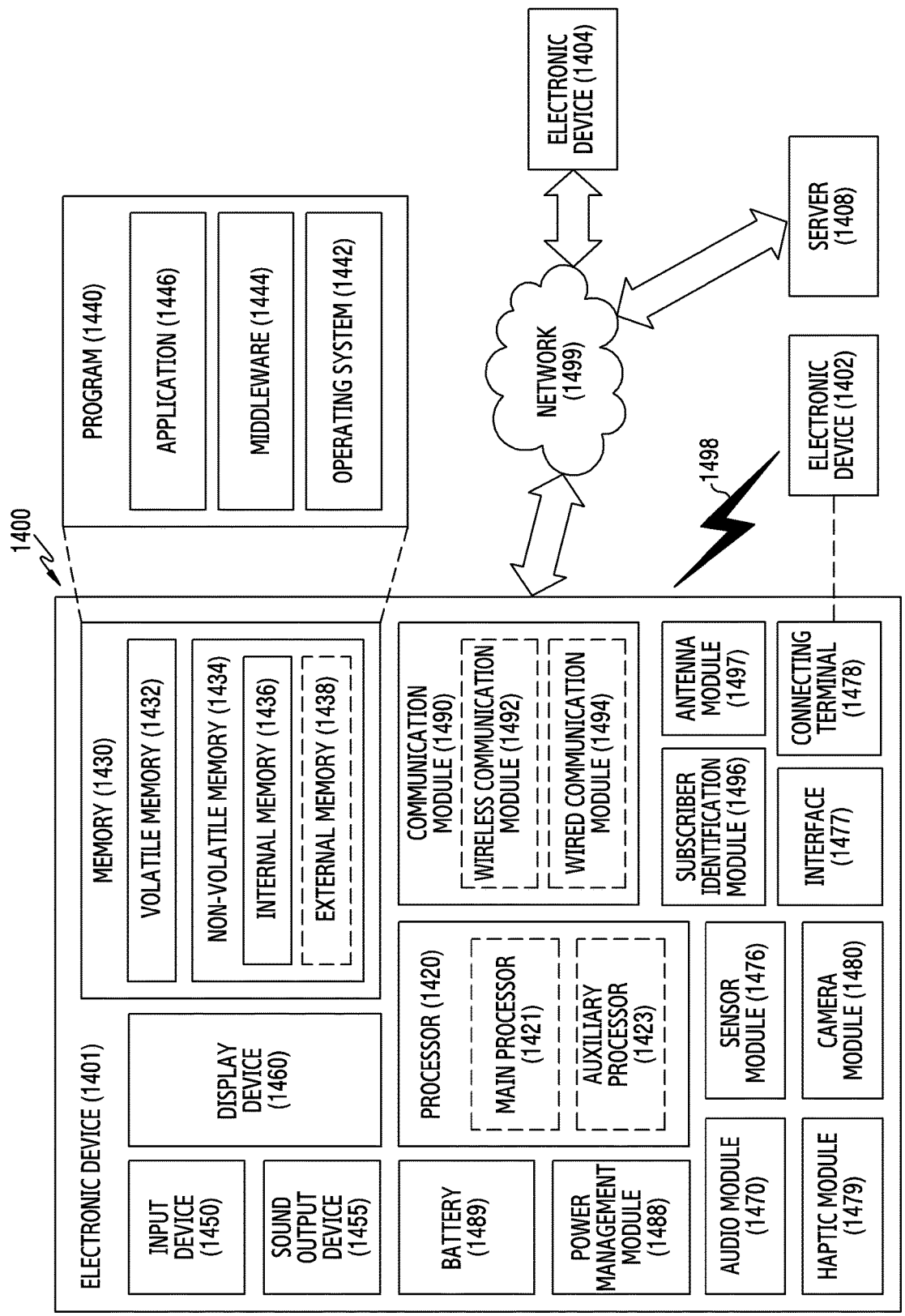
FIG. 14 is a block diagram of an electronic device within a network environment according to various embodiments.

FIG. 14 is a block diagram illustrating an electronic device 1401 in a network environment 1400 according to various embodiments. Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) 1496, or an antenna module 1497. In some embodiments, at least one (e.g., the display device 1460 or the camera module 1480) of the components may be omitted from the electronic device 1401, or one or more other components may be added in the electronic device 1401. In some embodiments, some of the components may be implemented as single integrated circuitry. For example, the sensor module 1476 (e.g., a fingerprint sensor, an iris sensor, or an illuminance sensor) may be implemented as embedded in the display device 1460 (e.g., a display).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may load a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input device 1450 may receive a command or data to be used by other component (e.g., the processor 1420) of the electronic device 1401, from the outside (e.g., a user) of the electronic device 1401. The input device 1450 may include, for example, a microphone, a mouse, or a keyboard.

The sound output device 1455 may output sound signals to the outside of the electronic device 1401. The sound output device 1455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. According to an embodiment, the display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. According to an embodiment, the audio module 1470 may obtain the sound via the input device 1450, or output the sound via the sound output device 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420

(e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. According to an embodiment, the antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, or hardware programmed with software, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The electronic device according to various embodiments disclosed in the present document may be various types of devices. The electronic device may include, for example, at least one of a portable communication device (e.g., a smart phone), a computer device, a portable multimedia device, a portable medical device, a camera, a wearable device, or a home appliance. The electronic device according to an embodiment of the present document is not limited to the aforementioned devices.

It should be appreciated that various embodiments of the present document and the terms used therein are not intended to limit the technology mentioned in the present document to a specified embodiment form, and include various modifications, equivalents, and/or alternatives of a corresponding embodiment. In relation to a description of the drawing, like reference symbols may be used for like components. The expression of a singular form may include the expression of a plural form unless otherwise dictating clearly in context. In the present document, the expressions "A or B", "at least one of A and/or B", "A, B or C", "at least one of A, B and/or C" or the like may include all available combinations of words enumerated together. The expressions "a first", "a second", "the first", "the second" or the like may use corresponding components irrespective of order and/or importance, and are nothing but used to distinguish a component from another component and do not limit the corresponding components. When it is mentioned that any (e.g., a first) component is "(operatively or communicatively) coupled with/to" or is "connected to" another (e.g., a second) component, the any component may be directly coupled to the another component, or be coupled via a further component (e.g., a third component).

The term "module" used in the present document may include a unit consisting of hardware, software or firmware, and may be, for example, used interchangeably with the term "logic", "logic block", "component", "circuitry" or the like. The module may be an integral part or the minimum unit performing one or more functions or a portion thereof. For example, the module may consist of an application-specific integrated circuit (ASIC).

Various embodiments of the present document may be implemented by software (e.g., the program 1440) that includes an instruction stored in a machine (e.g., computer)—readable storage media (e.g., the internal memory 1436 or the external memory 1438). The machine may be a device loading the stored instruction from the storage media and being operable according to the loaded instruction, and may include an electronic device (e.g., the electronic device 1401) of disclosed embodiments. In response to the command being executed by a processor (e.g., the processor 1420), the processor may perform a function corresponding to the command by itself or by using other components under the control of the processor. The command may include a code that is provided or executed by a compiler or interpreter. The machine-readable storage media may be provided in the form of a non-transitory storage media. Herein, 'non-transitory' just signifies that the storage media do not include a signal and is tangible, and does not distinguish that data is stored in the storage media semi-permanently or temporarily.

According to an embodiment, a method according to various embodiments disclosed in the present document may be included and provided in a computer program product. The computer program product may be traded as a product between a seller and a buyer. The computer program product may be distributed on-line in the form of a machine-readable storage media (e.g., a compact disc read only memory (CD-ROM)) or through an application store (e.g., PlayStore™). In online distribution, at least a part of the computer program product may be at least transitorily stored or be temporarily provided in a storage media such as a memory of a manufacturer's server, an application store's server or a relay server.

Each of constituent elements (e.g., modules or programs) according to various embodiments may consist of a single or plurality of entities and, among the aforementioned corresponding sub constituent elements, some sub constituent elements may be omitted, or other sub constituent elements may be further included in various embodiments. Alternatively or additionally, some constituent elements (e.g., modules or programs) may be integrated into one entity, to identically or similarly perform a function carried out by each individual constituent element. Operations carried out by a module, a program or a different component according to various embodiments may be executed in a sequential, parallel, repeated or heuristic manner, or at least some operations may be executed in different order or be omitted, or another operation may be added.

By changing a gradation value of a display providing light to a biometric sensor or adding an afterimage compensation frame, an electronic device of various embodiments and an operation method thereof may compensate a degradation of the display and may prevent an afterimage.

By identifying a pixel of a display that will provide light to a biometric sensor, an electronic device of various embodiments and an operation method thereof may retard a degradation speed of the display.

What is claimed is:

1. An electronic device comprising:
   a display comprising a plurality of pixels;
   a biometric sensor disposed in at least a partial region of the display; and
   at least one processor,
   wherein the at least one processor is configured to:
   receive an input for sensing biometric information of an external object;
   in response to the input, select at least one pixel among a first pixel and a second pixel based on how much the first and second pixels have emitted for biometric sensing in the past, wherein the first pixel and the second pixel are disposed in the at least the partial region of the display proximate to the biometric sensor; and
   obtain the biometric information of the external object through the biometric sensor by using light irradiated by the selected at least one pixel.

2. The electronic device of claim 1, wherein the at least one processor is configured to:
   identify properties of a plurality of sub pixels which are in the at least the partial region of the display proximate to the biometric sensor; and
   select at least one sub pixel among the plurality of sub pixels, based on the identified properties of the plurality of sub pixels.

3. The electronic device of claim 2, wherein the properties of the plurality of sub pixels comprise at least one of a color of light outputted from the sub pixel, a service life of the sub pixel, or a time of use of the sub pixel.

4. The electronic device of claim 2, wherein the at least one processor is configured to:
   set a luminance value of the at least the partial region of the display proximate to the biometric sensor, based on the identified properties of the plurality of sub pixels; and
   emit light from the selected at least one sub pixel, based on the set luminance value.

5. The electronic device of claim 2, wherein the at least one processor is configured to:
   when a sub pixel in the at least the partial region of the display proximate to the biometric sensor has a service life less than a threshold value, changing a gradation value of the sub pixel, based on an identified service life.

6. The electronic device of claim 1, wherein the at least one processor is configured to obtain the biometric information, based on at least in part on light that is reflected from the external object and then transmitted to the display.

7. An electronic device comprising:
   a display comprising a first region and a second region;
   a biometric sensor disposed in the second region of the display; and
   at least one processor,
   wherein the at least one processor is configured to:
   identify an occurrence of a biometric information acquisition event;
   identify at least one of an electronic device use time;
   increasing luminance of the second region, based at least in part on amount of electronic device use time; and
   obtain biometric information through the biometric sensor by using light outputted from the display, based on the increased luminance of the second region.

8. The electronic device of claim 7, wherein the biometric sensor is also disposed in the first region, and
   the at least one processor is configured to activate the biometric sensor disposed in the second region.

9. The electronic device of claim 7, wherein the at least one processor is configured to:
   when a sub pixel in the second region has a service life less than a threshold value, refine a gradation value of the sub pixel, based on an identified service life.

10. The electronic device of claim 7, wherein the electronic device further comprises an illumination sensor, and
    the at least one processor is configured to:
    obtain ambient light around the electronic device using the illumination sensor;
    identify whether a difference of a color of the ambient light and a color of the first region exceeds a threshold value;
    in response to the difference of the color of the ambient light and the color of the first region exceeding the threshold value, provide an afterimage compensation frame adjusting the color of the first region; and
    emit light from the display, based on the provided afterimage compensation frame.

11. The electronic device of claim 7, wherein the at least one processor is configured to identify that the biometric information acquisition event occurs as receiving an input for sensing biometric information of an external object.

12. The electronic device of claim 11, wherein the at least one processor is configured to obtain the biometric information, based on at least part of light that the outputted light is reflected from the external object and then transmits the display.

13. An electronic device comprising:
    a display comprising a first region and a second region;
    a biometric sensor disposed in the second region of the display; and
    at least one processor,
    wherein the at least one processor is configured to:
    identify an occurrence of a biometric information acquisition event;
    identify at least one of an electronic device use time or a biometric information acquisition history;
    set a luminance of the second region, based on at least one of the electronic device use time or the biometric information acquisition history;
    obtain biometric information through the biometric sensor by using light outputted from the display, based on the set luminance of the second region;
    in response to a difference of luminance of the first region and second region being equal to or being greater than a threshold value, add an afterimage compensation frame; and
    emit light from the display, based on the added afterimage compensation frame.

14. An electronic device comprising:
    a display comprising a first region and a second region;
    a biometric sensor disposed in the second region of the display; and
    at least one processor,
    wherein the at least one processor is configured to:
    identify an occurrence of a biometric information acquisition event;
    identify a plurality of pixel groups disposed in the second region and a biometric information acquisition history;

select at least one pixel group among the plurality of pixel groups, based on how much the plurality of pixel groups have emitted for biometric sensing in the past; and obtain biometric information through the biometric sensor by using light outputted from the selected pixel group.

15. The electronic device of claim 14, wherein the biometric sensor is also disposed in the first region, and
the at least one processor is configured to activate the biometric sensor disposed in the second region.

16. The electronic device of claim 14, wherein the at least one processor is configured to:
identify properties of a plurality of sub pixels which are comprised in the second region of the display; and
select at least one sub pixel among the plurality of sub pixels, based on the identified properties of the plurality of sub pixels.

17. The electronic device of claim 16, wherein the properties of the plurality of sub pixels comprise at least one of a color of light outputted from the sub pixel, a service life of the sub pixel, or a time of use of the sub pixel.

18. The electronic device of claim 14, wherein the at least one processor is configured to identify that the biometric information acquisition event occurs as receiving an input for sensing biometric information of an external object, and
obtain the biometric information, based on at least part of light that the outputted light is reflected from the external object and then transmits the display.

* * * * *